(12) United States Patent
Yamagata et al.

(10) Patent No.: US 10,623,617 B2
(45) Date of Patent: Apr. 14, 2020

(54) IMAGE PICKUP APPARATUS THAT HAS CONNECTOR FOR EXTERNAL DEVICE, DISPOSED AT OPTIMUM LOCATION

(71) Applicant: CANON KABUSHIKI KAISHA, Tokyo (JP)

(72) Inventors: Kenji Yamagata, Yokohama (JP); Yuko Teruya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/352,962

(22) Filed: Mar. 14, 2019

(65) Prior Publication Data

US 2019/0289183 A1    Sep. 19, 2019

(30) Foreign Application Priority Data

Mar. 19, 2018   (JP) .................................. 2018-051132

(51) Int. Cl.
  *H04N 5/225*   (2006.01)
  *G03B 17/56*   (2006.01)
  *G03B 31/00*   (2006.01)

(52) U.S. Cl.
  CPC ..... *H04N 5/225251* (2018.08); *G03B 17/563* (2013.01); *G03B 31/00* (2013.01)

(58) Field of Classification Search
  None
  See application file for complete search history.

(56) References Cited

U.S. PATENT DOCUMENTS

| | | | | |
|---|---|---|---|---|
| 2008/0018782 A1* | 1/2008 | Terakado | ............. | H04N 5/2252 348/376 |
| 2008/0252752 A1* | 10/2008 | Kosaka | ................ | H04N 5/2252 348/231.99 |
| 2009/0060465 A1* | 3/2009 | Igarashi | ............... | H04N 5/2251 386/224 |
| 2010/0110276 A1* | 5/2010 | Fujimoto | ............. | H04N 5/2251 348/360 |
| 2011/0102659 A1* | 5/2011 | Maekawa | ............ | H04N 5/2251 348/333.06 |
| 2012/0044621 A1* | 2/2012 | Fujiwara | ................ | G03B 17/02 361/679.01 |

(Continued)

FOREIGN PATENT DOCUMENTS

JP        2001189883 A    7/2001

*Primary Examiner* — William B Perkey
(74) *Attorney, Agent, or Firm* — Rossi, Kimms & McDowell LLP

(57) ABSTRACT

An image pickup apparatus capable of having an external device connector disposed at an optimum location without increasing the size of the apparatus. The image pickup apparatus includes an apparatus body, a handle that includes a front leg part and a rear leg part, which extend upward from the apparatus body, and a gripping part which connects between the front leg part and the rear leg part substantially in parallel with an optical axis of an image pickup optical system, a front part that is integrally formed with the handle on a front side of the handle, and a display unit that is supported in a manner rotatable with respect to the front part in a substantially horizontal direction via a first rotational shaft portion. A connector to which a first external device is connected is arranged on a side surface of the front leg part.

17 Claims, 27 Drawing Sheets

(56) References Cited

U.S. PATENT DOCUMENTS

| | | | |
|---|---|---|---|
| 2012/0162503 A1* | 6/2012 | Yano | H04N 5/2251 |
| | | | 348/376 |
| 2013/0050555 A1* | 2/2013 | Taniguchi | H04N 5/2252 |
| | | | 348/333.01 |
| 2018/0164663 A1* | 6/2018 | Ishida | G03B 17/14 |
| 2018/0275493 A1* | 9/2018 | Hirota | G03B 17/563 |
| 2018/0376037 A1* | 12/2018 | Arai | H04N 5/2252 |
| 2019/0285970 A1* | 9/2019 | Mano | H05K 7/20172 |
| 2019/0289183 A1* | 9/2019 | Yamagata | G03B 17/563 |

* cited by examiner

OPERATED STATE A

OPERATED STATE B

IMAGE PICKUP APPARATUS THAT HAS CONNECTOR FOR EXTERNAL DEVICE, DISPOSED AT OPTIMUM LOCATION

BACKGROUND OF THE INVENTION

Field of the Invention

The present invention relates to an image pickup apparatus, such as a digital camera and a digital video camera.

Description of the Related Art

In recent years, for an image pickup apparatus, such as a digital video camera, there have been proposed an increasing number of models each equipped with a connector for connecting an external microphone thereto, with a view to enabling the use of a higher performance external microphone than a built-in microphone. However, there is a problem that a cable of the connected external microphone can hinder the user from performing photographing operation.

To solve this problem, in Japanese Laid-Open Patent Publication (Kokai) No. 2001-189883, there has been proposed a technique for arranging a connector for an external microphone on one of side surfaces of a supporting portion provided on an image pickup apparatus such that the supporting portion protrudes forward from a front end of a handle of the image pickup apparatus. According to this proposal, it is possible to mount the connector for an external microphone without spoiling operability.

Incidentally, in recent years, some image pickup apparatuses are equipped with a display unit at a front end of a handle, which can be opened to both of right and left sides. If the technique described in Japanese Laid-Open Patent Publication (Kokai) No. 2001-189883 is applied to the image pickup apparatus of this type, there arises a problem that the front end of the handle becomes very thick, which increases the total height of the image pickup apparatus as a manufactured product, resulting in an increased size thereof.

SUMMARY OF THE INVENTION

The present invention provides an image pickup apparatus that includes a display unit provided at a front end of a handle and capable of being opened to both of horizontal right and left sides and is capable of having a connector for an external device, such as an external microphone, disposed at an optimum location without increasing the size of the apparatus.

The present invention provides an image pickup apparatus comprising an apparatus body, a handle that includes a front leg part and a rear leg part, which extend upward from the apparatus body, and a gripping part which connects between the front leg part and the rear leg part substantially in parallel with an optical axis of an image pickup optical system, a front part that is integrally formed with the handle on a front side of the handle in a direction of the optical axis of the image pickup optical system, and a display unit that is supported in a manner rotatable with respect to the front part in a substantially horizontal direction via a first rotational shaft portion, wherein a connector to which a first external device is connected is provided on a side surface of the front leg part.

According to the present invention, in the image pickup apparatus that includes a display unit provided at a front end of a handle and capable of being opened to both of horizontal right and left sides, it is possible to dispose a connector for an external device, such as an external microphone, at an optimum location without increasing the size of the apparatus.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
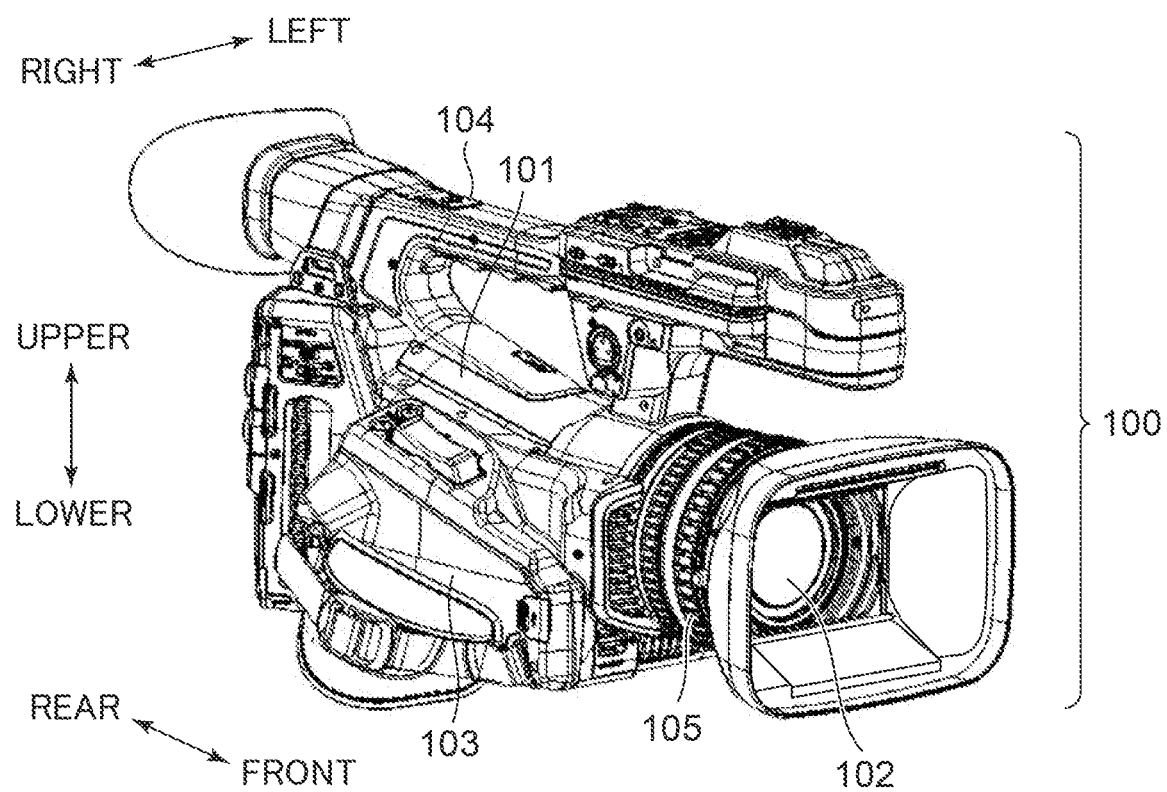
FIG. 1 is a perspective view of a digital video camera as an image pickup apparatus according to an embodiment of the present invention, as viewed from the front right side.
Figure 2:
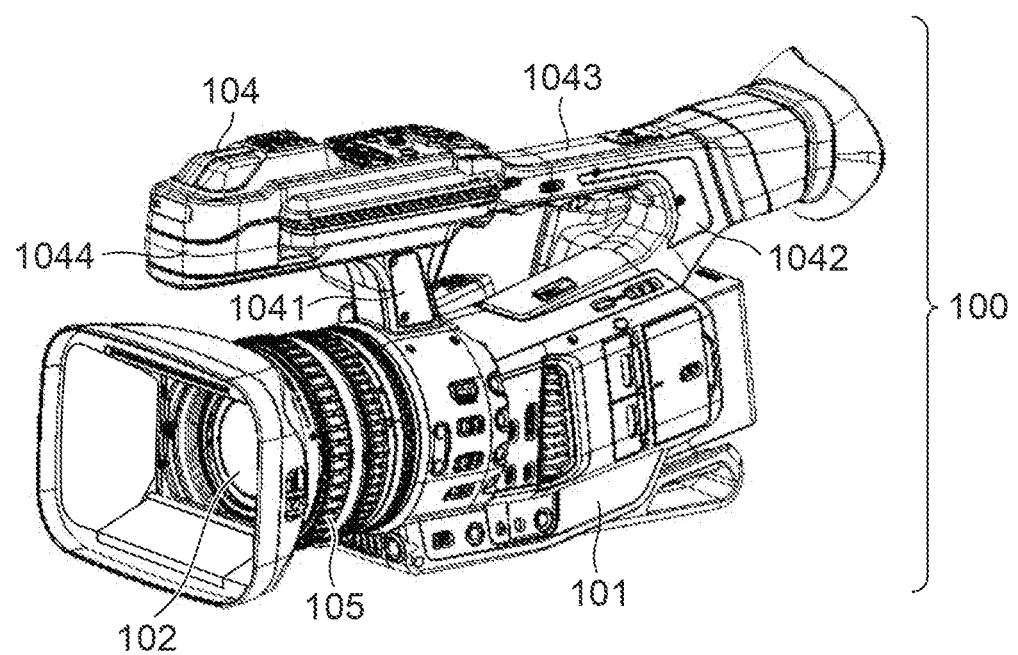
FIG. 2 is a perspective view of the digital video camera shown in FIG. 1, as viewed from the front left side.

FIG. 1 is a perspective view of a digital video camera as an image pickup apparatus according to an embodiment of the present invention, as viewed from the front right side. FIG. 2 is a perspective view of the digital video camera shown in FIG. 1, as viewed from the front left side. Note that in the present embodiment, as shown in FIG. 1, a side of the digital video camera toward an object is referred to as the front side, and a right side and a left side, as viewed from a rear side of the digital video camera, are referred to as the right side and the left side.

As shown in FIGS. 1 and 2, the digital video camera, denoted by reference numeral 100 (hereinafter referred to as the camera 100), according to the present embodiment includes a camera body 101, an image pickup optical system 102, a grip part 103, a handle 104, and operation rings 105.

The camera body 101 as an example of the apparatus main unit includes a main circuit board that controls the overall operation of the camera 100, a power supply section, a recording section, various operation sections, and so forth. The image pickup optical system 102 is formed integrally with the front side of the camera body 101, and includes a plurality of optical elements, such as a lens group formed by a plurality of lenses and a diaphragm, and actuators for driving these optical elements. An object light flux passing through the image pickup optical system 102 forms an image on an image pickup device, and is photoelectrically converted.

Further, the image pickup optical system 102 includes a zoom lens that changes an angle of view of a photographed image, and a focus lens that focuses on an object, and these lenses are moved in a direction of an optical axis by driving the respective actuators therefor. Further, by driving the actuator for the diaphragm, the amount of received light can be adjusted by the diaphragm.

The grip part 103 is a part for holding the camera 100 at the eye level of a photographer by one hand when photographing is performed. Further, the grip part 103 is provided with various operation elements, including parts for operating the actuators of the image pickup optical system 102, such as those for the zoom lens and the diaphragm, a trigger key for instructing the start and stop of recording, etc., which enables the photographer to smoothly operate the camera 100 by one hand when using the same for photographing. When the photographer uses the camera 100 by holding the same by one hand, the camera 100 can be more stably and more user-friendly used by holding the same using his/her dominant hand. In general, most of people use his/her right hand as the dominant hand, and hence in the present embodiment, the grip part 103 is disposed on the right side surface of the camera body 101.

The handle 104 is an annular part provided integrally with the top of the camera body 101. The photographer holds the handle 104 when low-angle photographing is performed by holding the camera 100 at a position lower than the eye level of the photographer, such as a position of the stomach of the photographer or a position near the floor brought in by the photographer bending his/her body, or when the photographer carries the camera 100. The handle 104 is composed of a handle front leg part 1041, a handle rear leg part 1042, a handle gripping part 1043, and a handle front part 1044, as roughly divided four parts thereof.

The handle front leg part 1041 is a columnar part extending upward from a portion of the top of the camera body 101, which is a little closer to the front side than the central portion. The handle rear leg part 1042 is a columnar part extending upward from a rear end portion of the top of the camera body 101. The handle gripping part 1043 is a part connecting between the handle front leg part 1041 and the handle rear leg part 1042 substantially in parallel with the optical axis of the image pickup optical system 102, at a location with a predetermined space from the top of the camera body 101.

Since there is the space between the handle gripping part 1043 and the top of the camera body 101, the handle gripping part 1043 can be held by hand. Further, a lower surface of the handle gripping part 1043 is formed with wavy projected and recessed portions, which enable the photographer' fingers to be easily caught when holding the handle gripping part 1043, so that the handle gripping part 1043 has a shape very easy to hold. The handle front part 1044 is a part protruding forward from the handle front leg part 1041 substantially in parallel with the optical axis of the image pickup optical system 102, and is disposed at a location above the operation rings 105, referred to hereinafter, with a predetermined space therefrom.

The operation rings 105 are arranged on the outer periphery of the image pickup optical system 102 in a manner rotatable about the optical axis, and the three operation rings 105 are arranged side by side in the optical axis direction. These three operation rings 105 are associated with adjustment of zoom, focus, and aperture of the image pickup optical system 102, respectively, and the photographer can perform each adjustment as desired by rotating an associated one of the operation rings 105.

Figure 3:
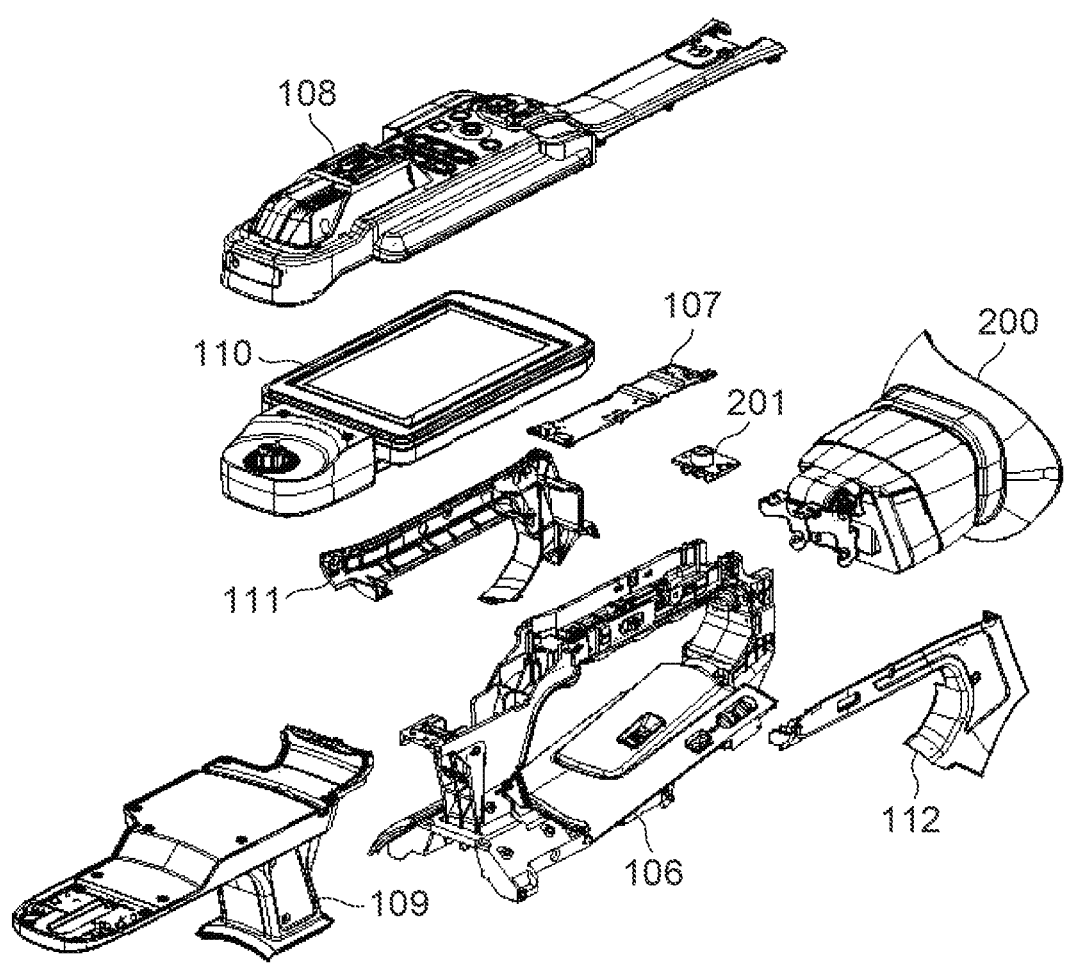
FIG. 3 is an exploded perspective view of a handle.

Next, details of the handle 104 will be described with reference to FIG. 3. FIG. 3 is an exploded perspective view of the handle 104. As shown in FIG. 3, the handle 104 includes a handle frame 106, a handle circuit board 107, a front unit 109, a display unit 110, an upper unit 108, a right side exterior part 111, a left side exterior part 112, an electronic viewfinder 200, an external device attachment portion 201.

The handle frame 106 is an annular component made of resin, which is reinforced by glass fiber or carbon fiber, and has an outer peripheral side formed into an opened U-shape in cross section. Further, the handle frame 106 has side surfaces each formed with a reinforcing rib 1061 (see FIG. 4), thereby being increased in rigidity, and is capable of sufficiently functioning as the frame of the handle 104.

The handle circuit board 107 relays circuit boards within the handle 104, and is fixed inside the handle gripping part 1043 of the handle frame 106. Further, the handle circuit board 107 is electrically connected to a main circuit board (not shown) of the camera body 101 by wires (not shown) and an FPC (not shown).

Figure 4:
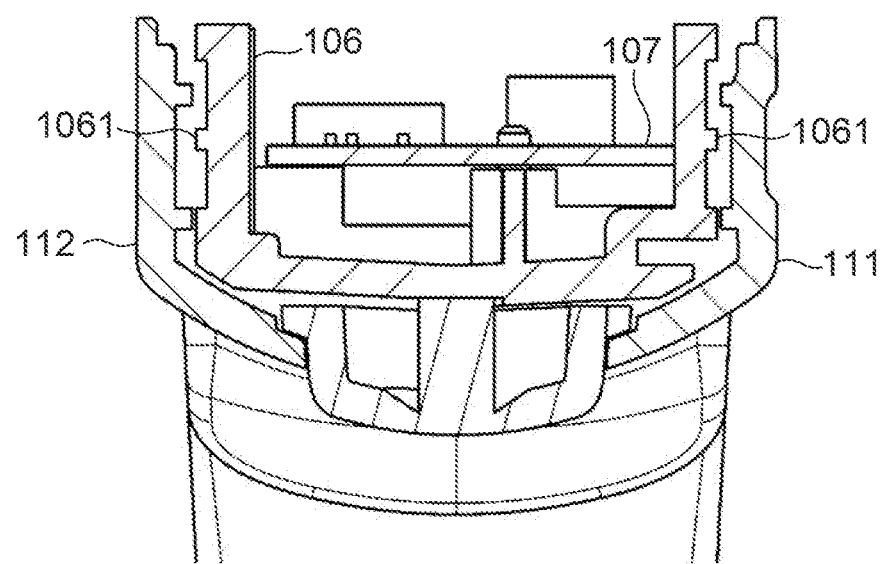
FIG. 4 is a cross-sectional view of the handle in a state in which a handle circuit board has been assembled therein, taken at the position of a handle holder.

FIG. 4 is a cross-sectional view of the handle 104 in a state in which the handle circuit board 107 has been assembled therein, taken at the position of the handle gripping part 1043. As shown in FIG. 4, the handle circuit board 107 is fixed to an inside of the U-shaped portion of the upper surface side of the handle frame 106. The upper unit 108 is an upper part of the handle gripping part 1043, extending from the handle front part 1044 to the rear end of the handle gripping part 1043, i.e. a part forming substantially the whole upper part of the handle 104, and details of the upper unit 108 will be described hereinafter.

The front unit 109 is a unit forming an area extending from the handle front leg part 1041 to the handle front part 1044, and details of the front unit 109 will be described hereinafter. The display unit 110 is a display device for displaying a photographed image or an image being captured, and for confirming various settings of the camera 100, and details of the display unit 110 will be described hereinafter.

The right side exterior part 111 is a component made of resin, forming the exterior surface of the left side of the handle 104, and is fixed to the handle frame 106. The left side exterior part 112 is a component made of resin, forming the exterior surface of the right side of the handle 104, and is fixed to the handle frame 106.

The electronic viewfinder (hereinafter referred to as the EVF) 200 is a display device for confirming the display of a photographed image or an image being captured, and details of the EVF 200 will be described hereinafter. The external device attachment portion 201 is a metal component capable of having an external accessory attached thereto, and details thereof will be described hereinafter.

Figure 5:
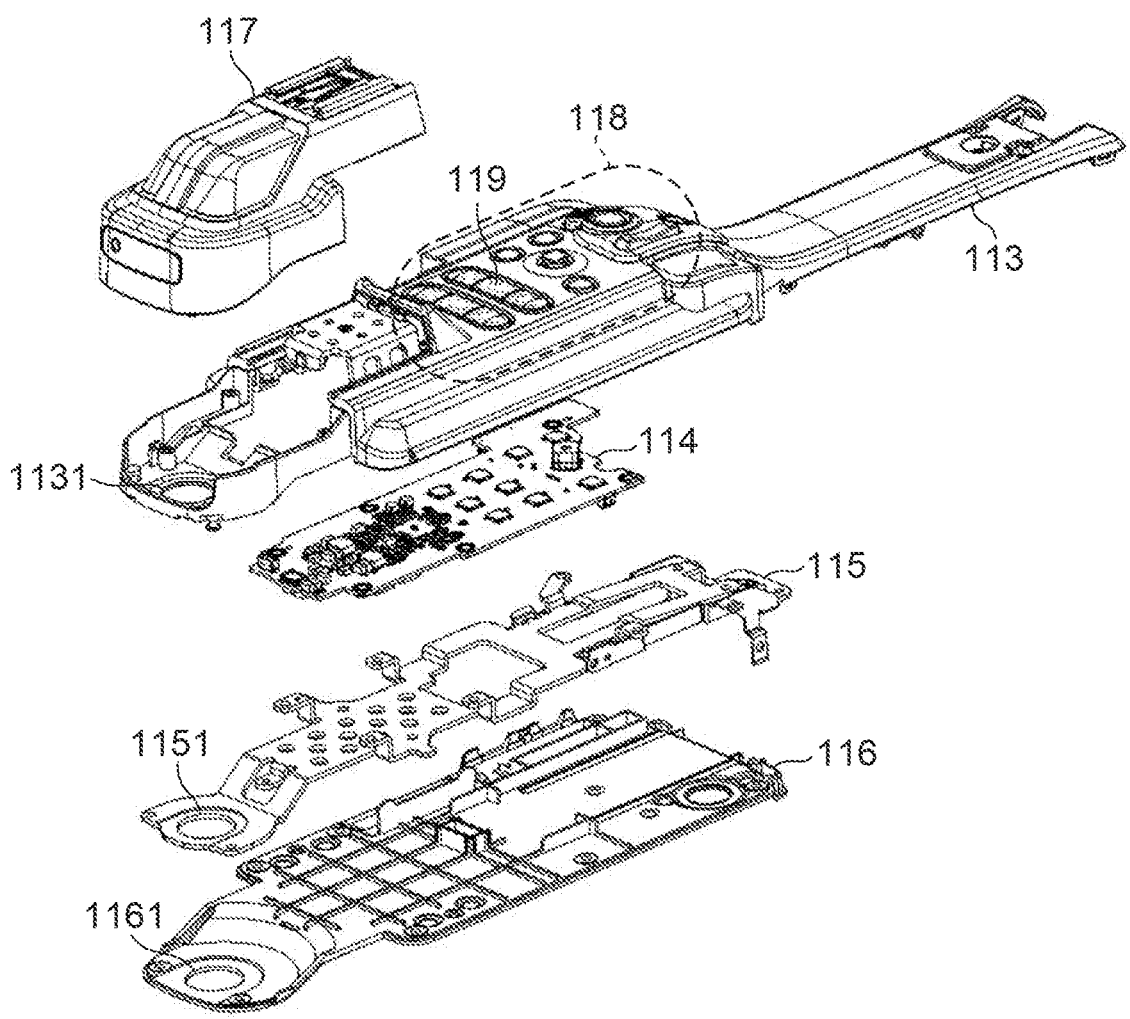
FIG. 5 is an exploded perspective view of an upper unit.

Next, the details of the upper unit 108 will be described with reference to FIG. 5. FIG. 5 is an exploded perspective view of the upper unit 108. As shown in FIG. 5, the upper unit 108 is a unit including an upper cover 113, an upper circuit board 114, a frame sheet metal 115, a back cover 116, and a microphone cover 117.

The upper unit 108 is formed by sandwiching the upper circuit board 114 and the frame sheet metal 115 between the upper cover 113 and the back cover 116, and is rigidly fixed to the handle frame 106. Further, an input operation section 118 is provided on the top surface of the upper unit 108. The input operation section 118 is comprised of a recording button for instructing the start and stop of recording, and a zoom button for instructing a zooming operation when photographing is performed.

Further, the input operation section 118 is disposed at a location where the photographer can smoothly operate the input operation section 118 with his/her thumb while gripping the handle gripping part 1043, and is configured to be very easy to use e.g. during low-angle photographing, since it can be easily operated by one hand even while holding the camera 100. The upper cover 113 is a main component of the upper unit 108, and has a keytop 119 of the input operation section 118, fixed on the reverse side thereof.

The upper circuit board 114 is a circuit board on which are mounted electric components for being pressed by the keytop 119 by operation on the input operation section 118, and a circuit of an audio processing system. Further, the upper circuit board 114 is electrically connected to the handle circuit board 107 by wires (not shown) so as to transfer information output from the circuit of the audio processing system and various input signals output from the input operation section 118, to the handle circuit board 107.

The frame sheet metal 115 is a sheet metal component provided inside the upper unit 108, and has high strength even as a single component. Therefore, the frame sheet metal 115 functions as a pillar of the upper unit 108, and receives and withstands a pressing load on the input operation section 118 to thereby prevent the upper unit 108 from being deformed. The back cover 116 is a member forming an exterior surface of the lower side of the upper unit 108, and covers the components inside the upper unit 108, such as the upper circuit board 114 and the frame sheet metal 115.

The microphone cover 117 is an exterior cover of a microphone (not shown) arranged inside, and part of the microphone cover 117, disposed just in front of the microphone, is formed of a mesh material. With this, sound from the outside can excellently reach the microphone. Further, the microphone is electrically connected to the upper circuit board 114 inside the microphone cover 117, and it is possible to record audio data obtained from around the camera 100.

The front portions of the upper cover 113, the frame sheet metal 115, and the back cover 116 are coaxially formed with circular holes 1131, 1151, and 1161, respectively. An inner diameter of the hole 1131 is set to be the smallest of these three holes 1131, 1151, and 1161.

Figure 6:
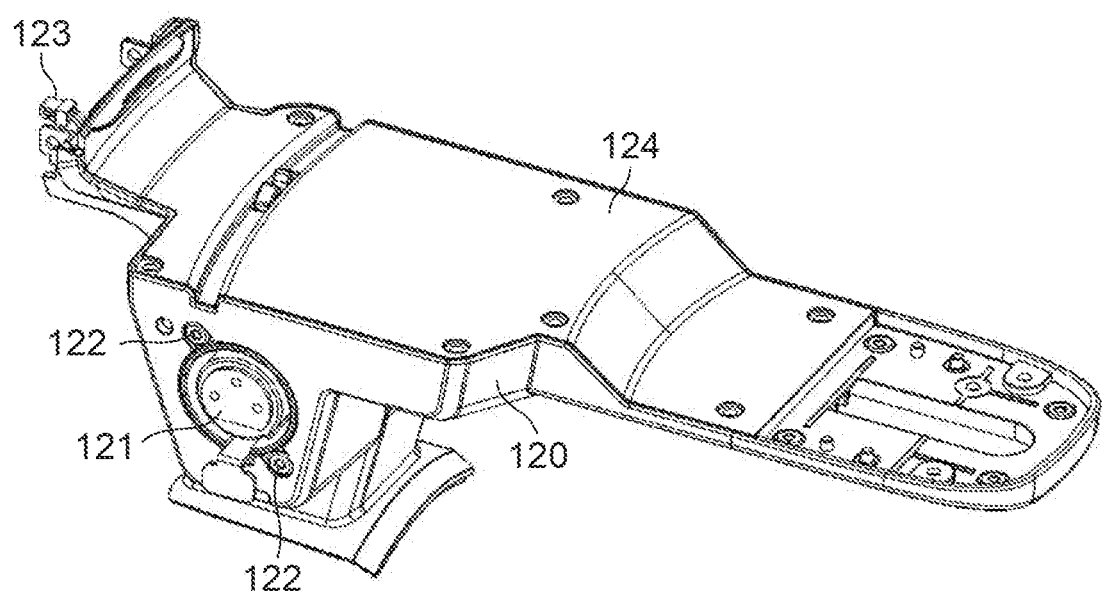
FIG. 6 is a perspective view of a front unit, as viewed from the front right side.

Next, the details of the front unit 109 will be described with reference to FIG. 6. FIG. 6 is a perspective view of the front unit 109, as viewed from the front right side. As shown in FIG. 6, the front unit 109 includes a front cover 120, a microphone input connector 121, fixing screws 122 for fixing the microphone input connector 121, microphone input wires 123, and a front top cover 124, and is rigidly fixed to the handle frame 106.

The front cover 120 is a die-cast part made of magnesium, and since it is formed of metal, the front cover 120 has high strength. Further, the front cover 120 forms the exterior surfaces of the left and right sides and the front side of the handle front leg part 1041, and the lower side of the handle front part 1044, and these exterior surfaces are integrally formed such that they are seamless and smooth.

In the present embodiment, a double structure is employed for the handle front leg part 1041 of the handle 104, such that the handle frame 106 formed of resin reinforced by glass fiber or carbon fiber is arranged inside, and the front cover 120 made of metal covers the outside of the handle frame 106. Further, the front cover 120 made of metal is integrally formed from the handle front leg part 1041 to the handle front part 1044, and hence the front unit 109 has a structure which is very strong against an external force.

The microphone input connector 121 is an XLR type connector terminal. When an external microphone as an external device is connected to the microphone input connector 121, audio data can be recorded by transmitting audio signals to the main circuit board of the camera body 101 and performing predetermined signal processing thereon.

Note that external microphones which are generally used are configured to have three electric signal lines for a GND signal, an original signal (HOT), and a signal (COLD) having a phase opposite to that of the original signal, so as to reduce audio noise. Further, the connector of the external microphone generally uses the XLR type connector terminal, and hence it is desirable to use an XLR type connector terminal for the input terminal for inputting signals from the external microphone, which makes it possible to connect numerous kinds of external microphones.

Figure 7:
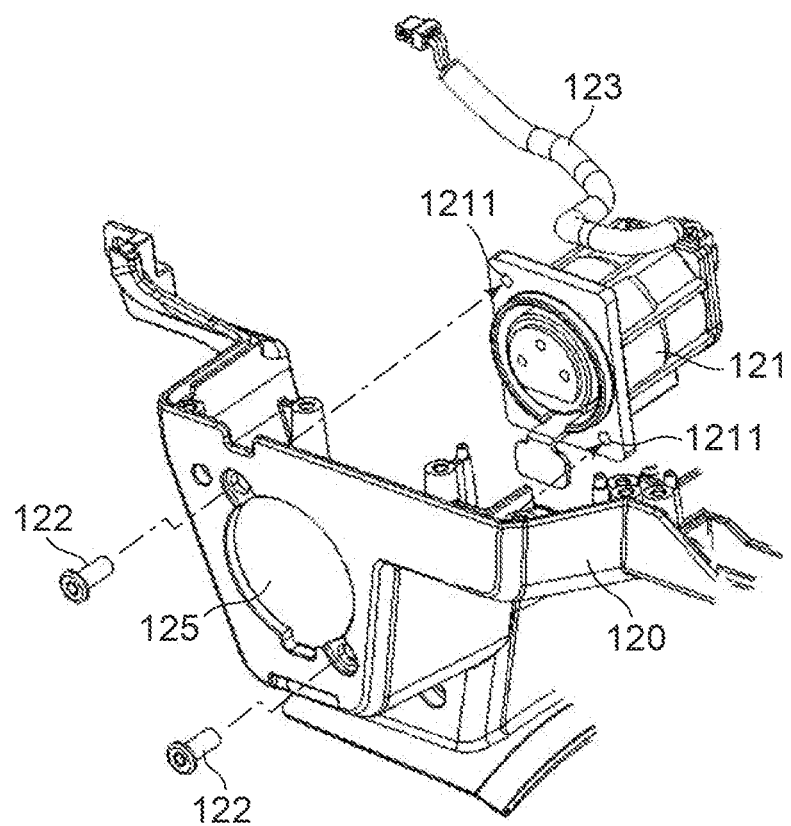
FIG. 7 is an exploded perspective view useful in explaining how to fix a microphone input connector.

Next, how to fix the microphone input connector 121 will be described with reference to FIG. 7. FIG. 7 is an exploded perspective view useful in explaining how to fix the microphone input connector 121. As shown in FIG. 7, the microphone input connector 121 is inserted into an opening 125 formed in the front cover 120 from the inside such that part thereof for connection to an external microphone is exposed to the appearance. After that, by screwing the fixing screws 122 into female screws 1211 formed in the microphone input connector 121, respectively, the microphone input connector 121 is rigidly held by the front cover 120, in a state sandwiching the front cover 120 between the same and the fixing screws 122.

Since the microphone input connector 121 is rigidly fixed to the front cover 120 made of metal, even if a strong force is applied e.g. to the connector part of the connected external microphone, the fixing part is prevented from being broken, and the microphone input connector 121 has very high reliability.

The microphone input wires 123 have one ends connected to the microphone input connector 121, and the other ends connected to the handle circuit board 107, and transfer audio signals input to the microphone input connector 121 from the external microphone to the handle circuit board 107. The front top cover 124 is a member forming the exterior surface of the upper side of the front unit 109, and covers the components inside the front unit 109, such as the microphone input connector 121 and the microphone input wire 123.

Figure 8:
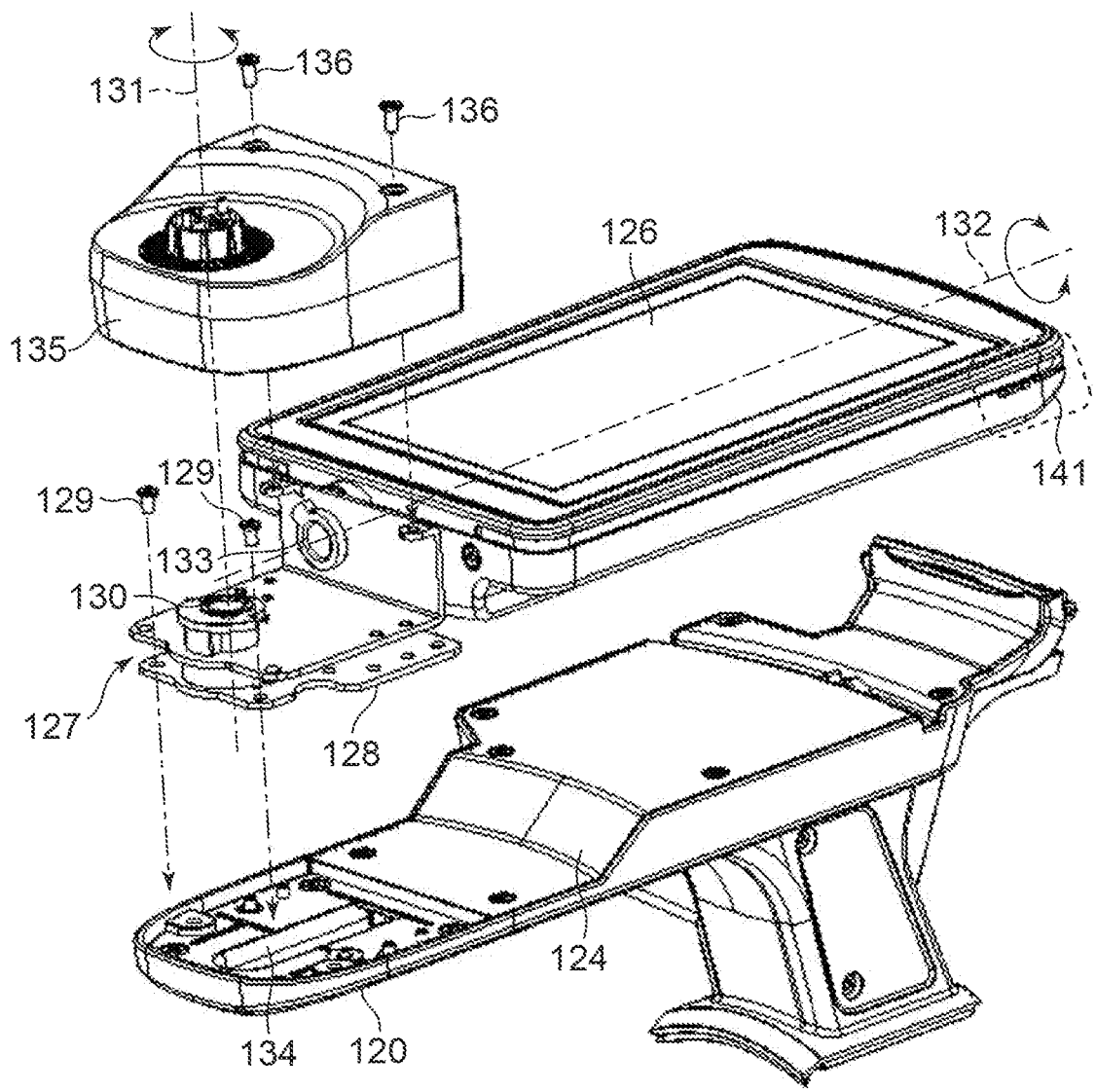
FIG. 8 is a perspective view useful in explaining the construction of a display unit and how to fix the display unit.

Next, the details of the display unit 110 will be described with reference to FIG. 8. FIG. 8 is a perspective view useful in explaining the construction of the display unit 110 and how to fix the display unit 110. As shown in FIG. 8, the display unit 110 is a unit formed by connecting a handle hinge 127 to an assembly integrally formed by a display surface 126 which is a flat display monitor, such as a liquid crystal display, and a circuit board (not shown) for controlling the display surface 126. In a state of the display unit 110 having the handle hinge 127 connected thereto, a state of the display surface 126 facing upward is defined as a positive posture. The handle hinge 127 has a hinge base 128 as its base, fixed to a front end portion of the front cover 120 of the front unit 109 with hinge fixing screws 129.

Further, as mentioned above, since the front cover 120 is also very strong, the fixing strength of the handle hinge 127 is sufficiently ensured. The handle hinge 127 is formed by combining thick sheet metal members, and has very high strength. With this, the display surface 126 is held with high rigidity.

Further, a hollow first rotational shaft portion 130 having a central axis in a vertical direction is pivotally supported to the hinge base 128, in a direction substantially orthogonal to the optical axis of the image pickup optical system 102. The handle hinge 127 is supported on the hinge base 128 in a manner rotatable in both of the right and left directions about a first rotational axis 131 which is the central axis of the first rotational shaft portion 130.

Further, in addition to the first rotational axis 131 of the first rotational shaft portion 130, the handle hinge 127 has a second rotational axis 132 substantially orthogonal to the axial direction of the first rotational axis 131, and is supported in a manner rotatable about the second rotational axis 132. This second rotational axis 132 is a central axis of a second rotational shaft portion 133, and the second rotational shaft portion 133 is a hollow member similar to the first rotational shaft portion 130. The first rotational shaft portion 130 and the second rotational shaft portion 133 are both formed by the hollow members, and hence display wires (not shown) can be passed through the inside of the first rotational shaft portion 130 and the second rotational shaft portion 133.

With this, by passing the above-mentioned display wires through the two rotational shaft portions 130 and 133, it is possible to pass them from the above-mentioned circuit boar which is provided in the vicinity of the display surface 126 for controlling thereof to the front unit 109. Under the hinge base 128, the front unit 109 is provided with a space 134 between the front cover 120 and the front top cover 124 at a location directly under the first rotational shaft portion 130.

The space 134 extends inside the handle front part 1044 up to the handle front leg part 1041, and by passing the display wires through the space, it is possible to connect the display wires to the main circuit board of the camera body 101. Note that the space 134 is a space which is only large enough to pass the display wires therethrough and is very small. Therefore, an area of the handle front part 1044 under the display unit 110, formed by the front cover 120 and the front top cover 124, is very thin. On opposite sides of the display surface 126 on the front end of the display unit 110, opening operation sections 141 as finger hooks formed by protrusions provided on the exterior are laterally symmetrically provided.

As described above, the display unit 110 can be operated in opening and closing directions by action of the handle hinge 127 such that it is moved between an accommodated state (closed state) and an opened state. By applying a force to one of the opening operation sections 141 from a lateral direction, the display unit 110 is rotated about the first rotational axis 131 in a substantially horizontal direction to be opened. Note that in the present embodiment, the display unit 110 can be opened to both of the right and left sides.

The second rotational shaft portion 133 is configured to make it possible to turn the display surface 126 such the display surface 126 faces rearward, upward, downward and forward, even in a case where the display unit 110 is rotated to whichever of the right and left sides. Further, a friction mechanism is incorporated in each of the first rotational shaft portion 130 and the second rotational shaft portion 133, and hence the photographer can stop the handle hinge 127 at a desired position. With this mechanism, the display unit 110 is capable of desirably changing the angle of the display surface 126 after the display unit 110 is opened from the accommodated state to the right or left side. Note that not a free-stop mechanism for stopping the display surface 126 at a desired angle, but an angle adjustment mechanism for stopping the display surface 126 only at predetermined angles (e.g. at every 45°) may be incorporated.

Part of the handle hinge 127, which can be viewed from the outside, is covered by a hinge cover 135. The hinge cover 135 is fixed to the handle hinge 127 with fixing screws 136, and is rotated in conjunction with the rotational operation about the first rotational axis 131 in unison with the handle hinge 127.

Figure 9:
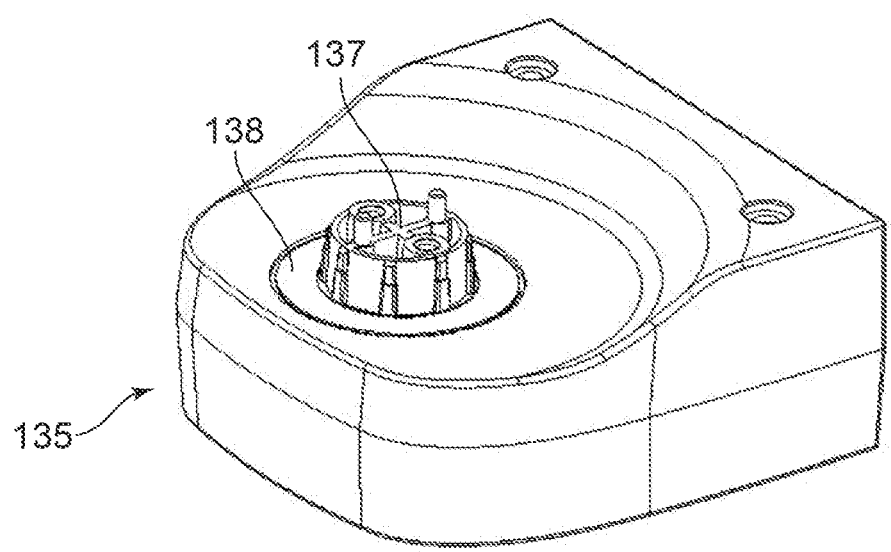
FIG. 9 is a perspective view of a hinge cover.

Next, details of the hinge cover 135 will be described with reference to FIG. 9. FIG. 9 is a perspective view of the hinge cover 135. As shown in FIG. 9, the hinge cover 135 is provided with a circular protruding portion 137 protruding from an upper surface thereof. Further, a circular sliding portion 138 is provided around the protruding portion 137. The sliding portion 138 has one surface formed of a resin material having low sliding resistance, such as PET, and the other surface formed of a material having adhesiveness. The sliding portion 138 is disposed such that the other surface having adhesiveness is affixed to the hinge cover 135, and the one surface having low sliding resistance, such as PET, is exposed upward.

The protruding portion 137 and the sliding portion 138 both have a circular shape as mentioned above, and have the central axes thereof disposed substantially coaxially with the first rotational axis 131 of the display unit 110. That is, in the display unit 110, the exterior surface of the handle hinge 127 is covered by the hinge cover 135, and hence in a case where the handle hinge 127 is rotated about the first rotational axis 131, the display unit 110 appears to be rotated about the protruding portion 137.

Figure 10:
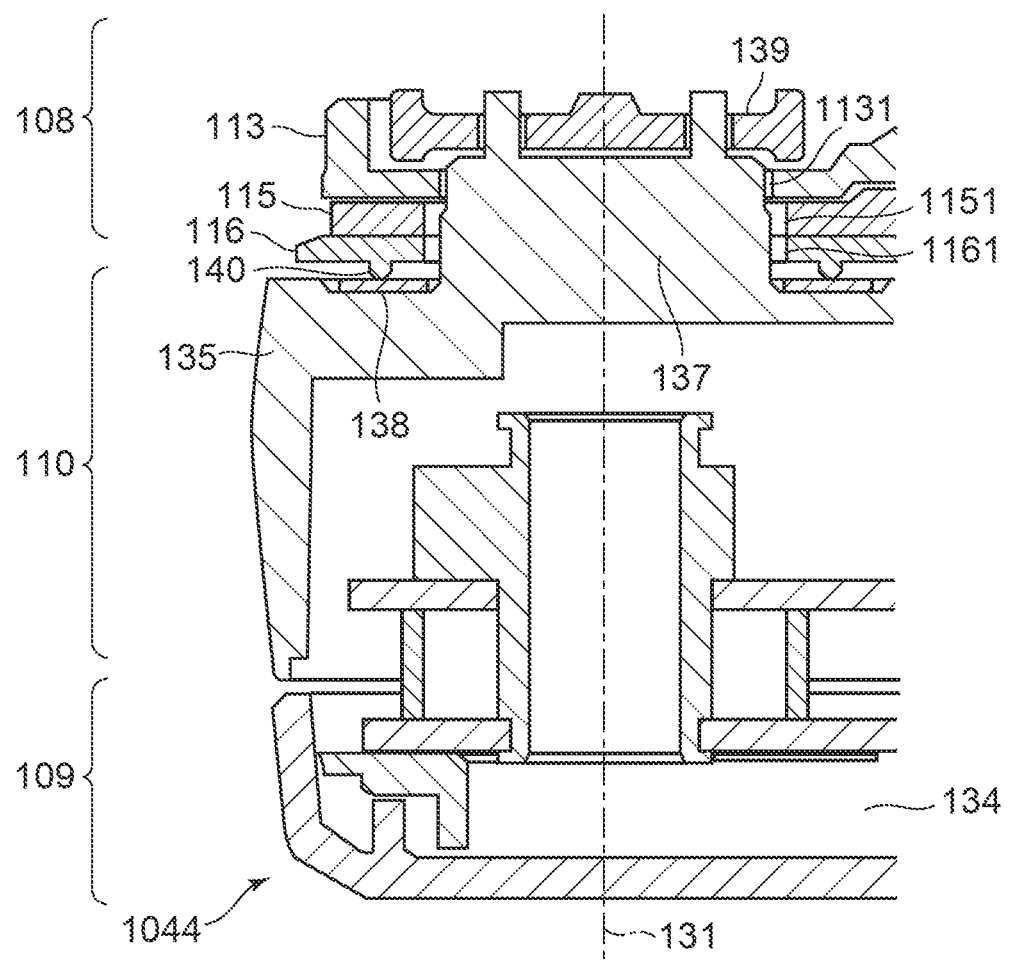
FIG. 10 is a cross-sectional view of a handle front part, taken along a first rotational axis.

Next, the construction of the handle front part 1044 will be described with reference to FIG. 10. FIG. 10 is a cross-sectional view of the handle front part 1044, taken along the first rotational axis 131. As mentioned above, in the handle front part 1044 of the handle 104, the front unit 109, the display unit 110, and the upper unit 108 are arranged in a state layered in the mentioned order from the lower side. Further, the display unit 110 is supported such that it is substantially horizontally rotatable about the first rotational axis 131.

Here, as shown in FIG. 10, the protruding portion 137 of the hinge cover 135 is inserted in the holes 1131, 1151, and 1161 of the upper unit 108. Further, a flange member 139 is rigidly connected to the tip end of the protruding portion 137. The flange member 139 has an outer shape larger in diameter than the holes 1131, 1151, and 1161 of the upper unit 108. That is, the upper cover 113, the frame sheet metal 115, and the back cover 116 of the upper unit 108 are sandwiched between the sliding portion 138 of the hinge cover 135 and the flange member 139.

Further, the hole 1131 is the smallest in inner diameter of the three holes 1131, 1151, and 1161, and hence a hole closest to the protruding portion 137 in a radial direction is the hole 1131. Further, part of the lower surface of the back cover 116, opposed to the sliding portion 138, is formed with a ring-shaped sliding rib 140 protruding downward from part of the lower surface surrounding the sliding rib 14. Similar to the hole 1161, this sliding rib 140 is disposed concentrically with the first rotational axis 131.

Further, a predetermined clearance is formed between the upper unit 108 and the display unit 110 in the vertical direction, and is set to have the smallest distance between the sliding portion 138 and the sliding rib 140.

Figure 11:
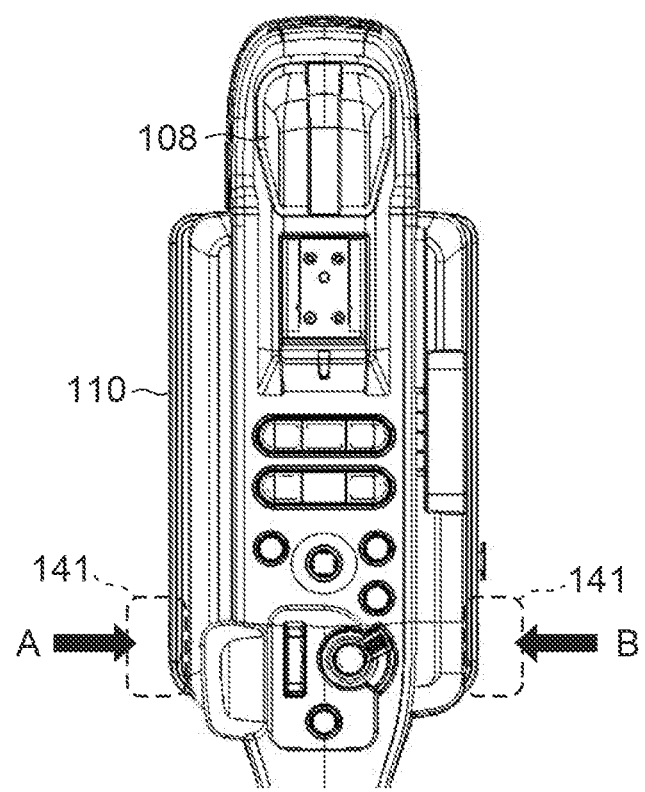
FIG. 11 is a top view showing an accommodated state of the display unit.
Figure 12:
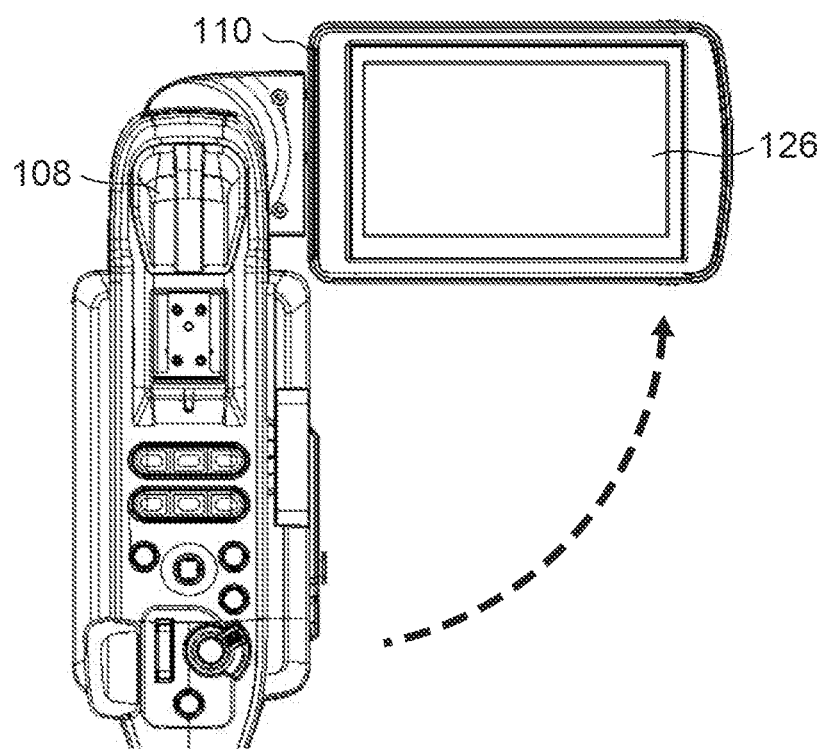
FIG. 12 is a top view showing a state of the display unit in which the display unit has been opened to the right side.
Figure 13:
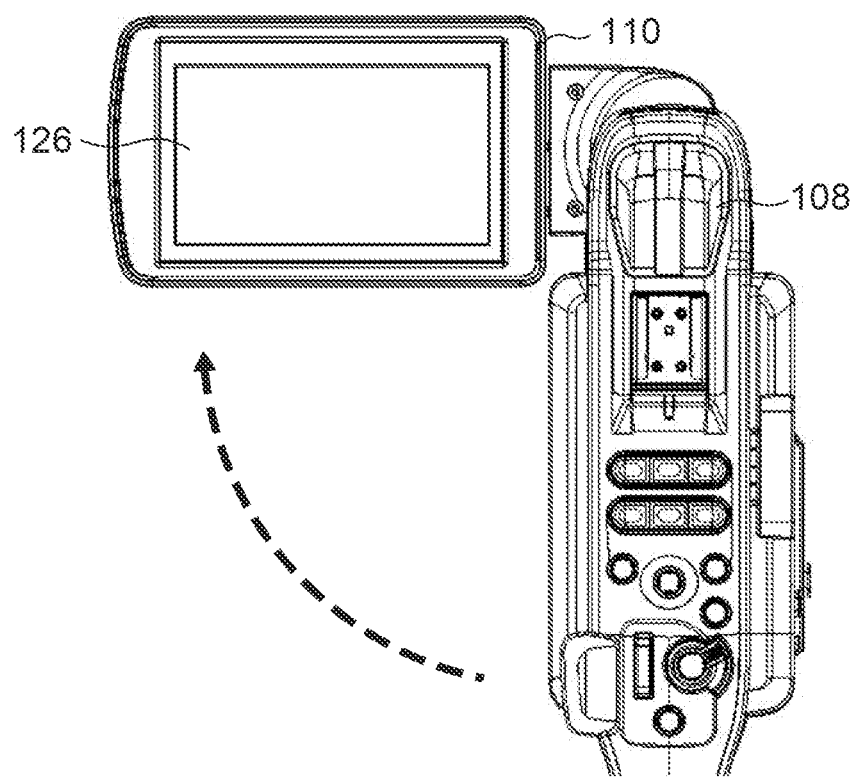
FIG. 13 is a top view showing a state of the display unit in which the display unit has been opened to the left side.

Next, the operation for opening and closing the display unit 110 of the handle 104 will be described with reference to FIGS. 11 to 14. FIG. 11 is a top view showing the accommodated state of the display unit 110. FIG. 12 is a top view showing a state (in-use state) of the display unit 110 in which it has been opened to the right side. FIG. 13 is a top view showing a state (in-use state) of the display unit 110 in which it has been opened to the left side.

As described above, the display unit 110 is fixed to the front unit 109 in the state in which the display surface 126 faces upward. Therefore, in the accommodated state of the display unit 110, the display surface 126 is in a state opposed to the lower surface of the upper unit 108. In this state, the upper unit 108 covers the whole area of the display surface 126, and protects the display surface 126.

Further, when the display unit 110 is opened from the accommodated state shown in FIG. 11 to the opened state shown in FIG. 12 or 13, a lateral force is applied to one of the opening operation sections 141 provided on the opposite sides of the front end of the display unit 110. More specifically, to open the display unit 110 to the right side, the photographer applies a force in a direction indicated by an arrow A in FIG. 11, and to open the display unit 110 to the left side, the photographer applies a force in a direction indicated by an arrow B in FIG. 11.

With this operation, the display unit 110 is rotated about the first rotational axis 131, and comes out in the intended direction. Then, the photographer pinches the front end of the display unit 110 by thumb and index finger, and draws out the display unit 110 by rotating the same through approximately 90° in a state in which the display surface 126 is exposed upward to thereby move the display unit 110 to a position where the front end of the display unit 110 is oriented in a strict lateral direction.

Note that in the present embodiment, the display unit 110 is larger in external dimension in the lateral direction than the upper unit 108 even though the whole display surface 126 is covered by the upper unit 108, and is slightly exposed from the outer shape of the upper unit 108. This enables the photographer to easily operate one of the opening operation sections 141 when opening the display unit 110 from the accommodated state. After the display unit 110 has been opened to the position shown in FIG. 12 or 13, the display unit 110 can be rotated about the second rotational axis 132.

Figure 14:
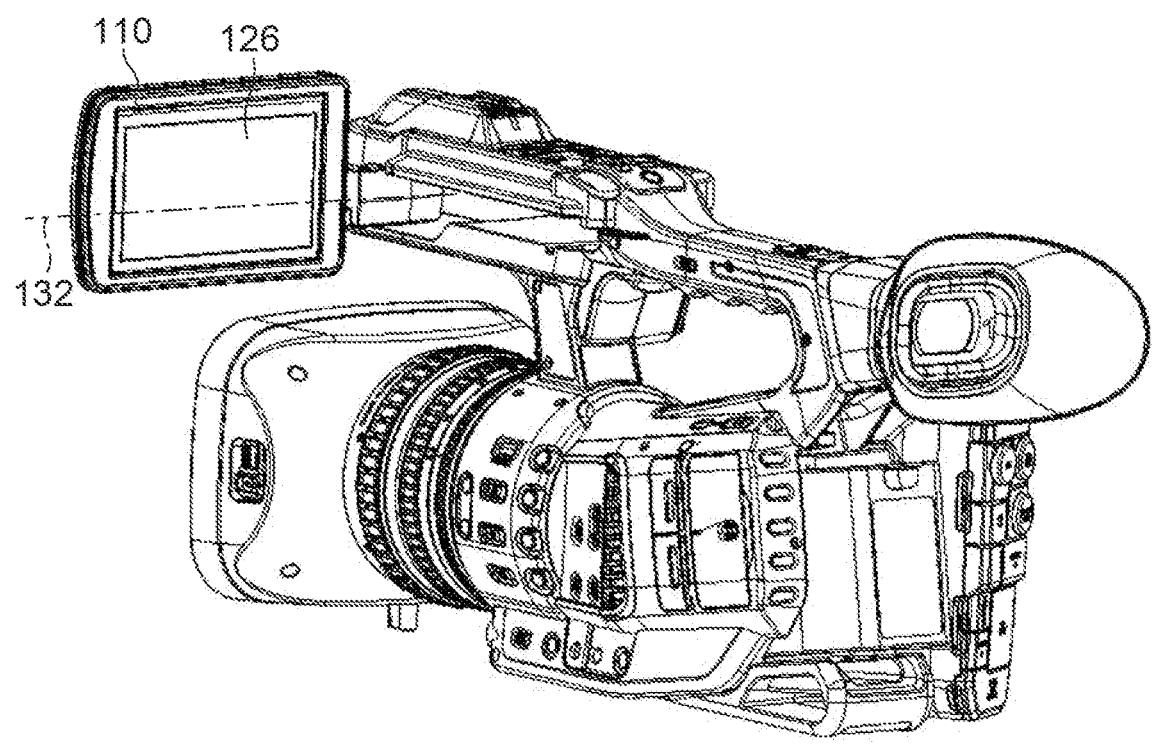
FIG. 14 is a perspective view showing a state of the display unit in which the display unit has been opened to the left side, and then rotated about a second rotational axis.

FIG. 14 is a perspective view showing a state in which the display unit 110 has been opened to the left side, and then rotated about the second rotational axis 132. This makes it possible, for example, to turn the display surface 126 to face downward when performing high-angle photographing, turn the display surface 126 to face upward when performing low-angle photographing, and turn the display surface 126 to face toward the front side when performing self-photographing with the camera 100 fixed to a tripod. With this, it is possible to adjust the orientation of the display surface 126 so as to cause the same to face the photographer according to a situation of photographing, such as an object position. Therefore, the photographer can satisfactorily view the display surface 126 in any photographing posture.

Further, the display unit 110 is disposed at such a location and formed into such a shape that the display unit 110 is prevented from entering the photographing angle of view of the image pickup optical system 102 in whichever direction the display unit 110 is rotated about one or both of the first rotational axis 131 and the second rotational axis 132. With this, the photographer can open the display unit 110 to a position where the photographer can most easily view the display surface 126 without considering whether or not the display unit 110 enters the photographing angle of view. Note that to accommodate the display unit 110, the above-mentioned opening operation is performed in the reverse order.

As described above, the display unit 110 is not brought into direct contact with the upper unit 108 due to provision of clearance formed between the display unit 110 and the adjacent upper unit 108. Therefore, in a case where the display unit 110 is rotated about the first rotational axis 131, unnecessary contact resistance (friction) is not generated, and the display unit 110 can be smoothly operated.

Here, let us consider a case in which an external force is applied to the display unit 110 when in use in the opened state.

The front cover 120 to which the display unit 110 is attached is very rigid because the front cover 120 is formed of metal, and can sufficiently withstand some load. Further, even when an external force which elastically deforms the front cover 120 is applied to the display unit 110, if it is applied from the lower side toward the upper side, the sliding portion 138 on the upper surface of the display unit 110 and the sliding rib 140 on the lower surface of the upper unit 108 are brought into abutment with each other. With this, the upper unit 108 can hold the display unit 110 from the above.

Inversely, if the external force is applied to the display unit 110 from the upper side toward the lower side, the lower side of the flange member 139 connected to the protruding portion 137 of the hinge cover 135 is hooked on the upper cover 113, whereby the upper unit 108 pulls the display unit 110 from the upper side.

Further, when the external force is laterally applied to the display unit 110, the protruding portion 137 of the hinge cover 135 is brought into abutment with a peripheral surface of the hole 1131, whereby the upper unit 108 laterally supports the display unit 110. At this time, the protruding portion 137 and the hole 1131 are both formed into a circular shape having the central axis coaxial with the first rotational axis 131. Therefore, it is possible to similarly support the display unit 110 even when an external force is applied to the display unit 110 from any direction, irrespective of a phase of the display unit 110 with respect to the first rotational axis 131 and a direction in which the external force is applied.

From the above, even when an external force with such a degree as will elastically deform the front cover 120 is applied to the display unit 110 from any direction, the handle front part 1044 of the present embodiment can withstand the external force from both of the upper side and the lower side of the display unit 110. The upper unit 108 is a unit of which strength is secured by the frame sheet metal 115 having high rigidity, and hence the upper unit 108 largely contributes to improvement of the strength of the display unit 110, which improves the reliability of the product.

Figure 15:
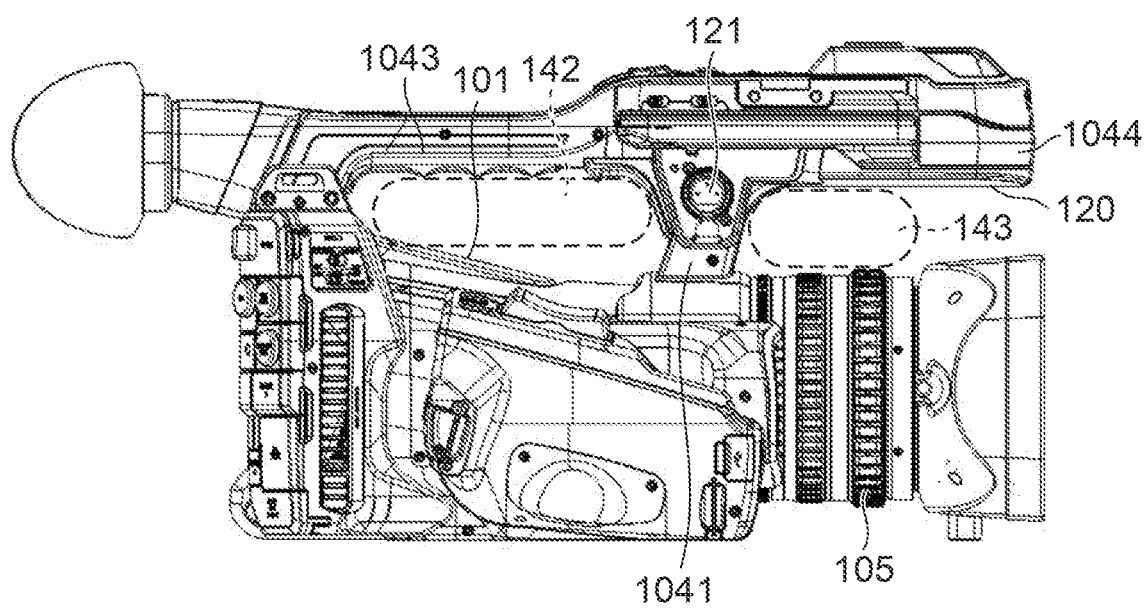
FIG. 15 is a right side view showing a disposition of the microphone input connector.
Figure 16:
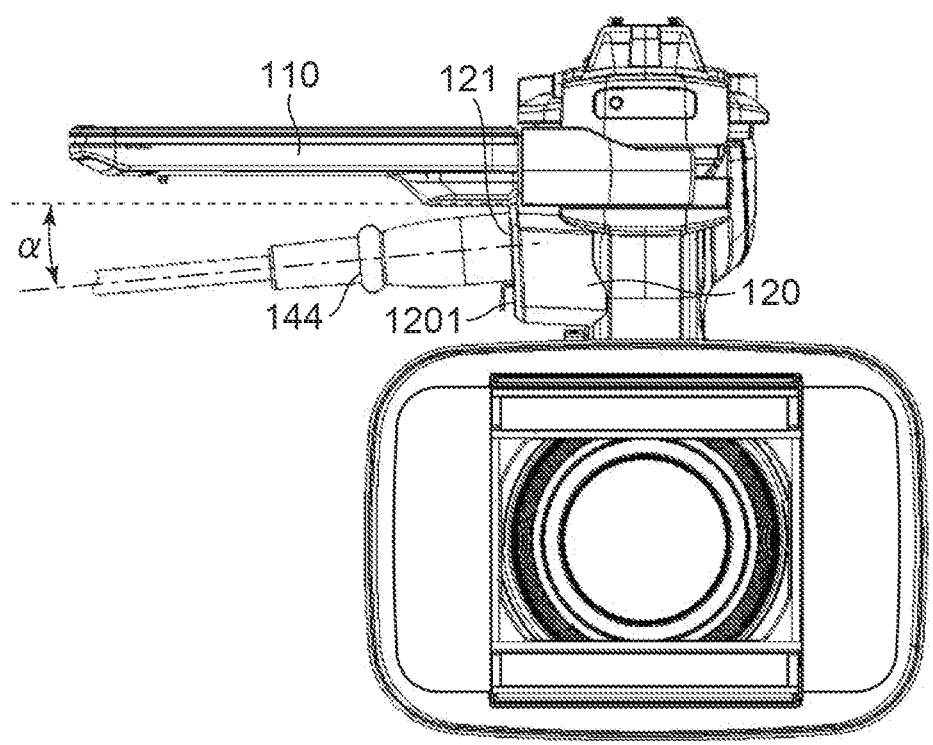
FIG. 16 is a front view showing the disposition of the microphone input connector.
Figure 17:
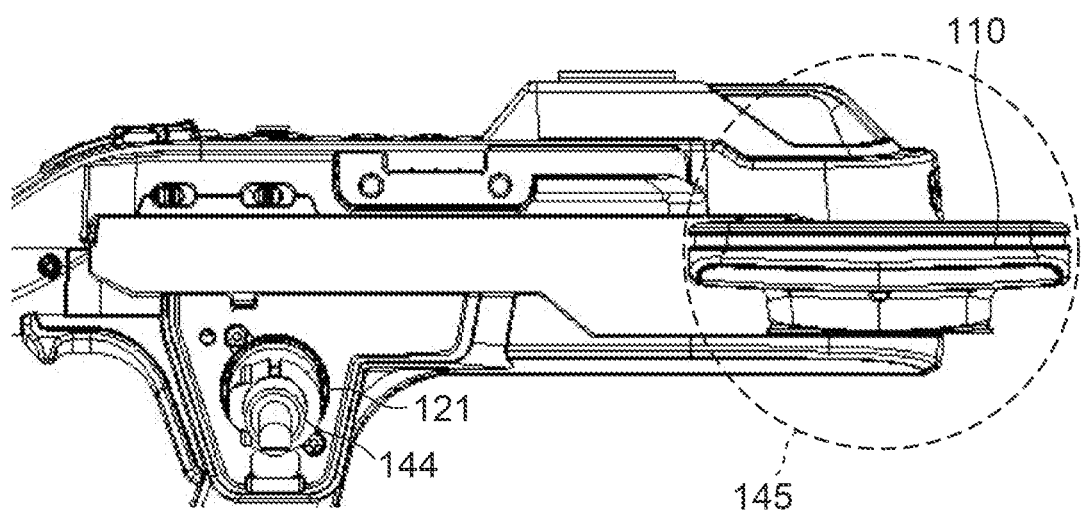
FIG. 17 is a view showing a positional relationship between the microphone input connector and the display unit in a front-rear direction.

Next, the disposition of the microphone input connector 121 will be described with reference to FIGS. 15 to 18. FIG. 15 is a right side view showing the disposition of the microphone input connector 121. FIG. 16 is a front view showing the disposition of the microphone input connector 121. Note that FIG. 16 shows a state of the microphone input connector 121 in which an external microphone is connected thereto. FIG. 17 is a view showing a positional relationship between the microphone input connector 121 and the display unit 110 in a front-rear direction.

The microphone input connector 121 is provided on the right side surface of the handle front leg part 1041, as shown in FIG. 15, and the position where the microphone input connector 121 is provided is within an imaginarily projected shadow of the handle front leg part 1041, as viewed from the right side. When holding the camera 100 using the handle 104, the photographer inserts his/her four fingers, i.e. the index finger to the little finger, through a gripping space 142 between the handle gripping part 1043 and the camera body 101, and holds the camera 100 by gripping the handle gripping part 1043.

Further, when operating each operation ring 105, the photographer inserts a finger of his/her in a ring operation space 143 between the operation rings 105 and the handle front part 1044, and performs an operation for rotating a desired one of the operation rings 105 about the optical axis of the image pickup optical system 102 by clasping the outer periphery of the operation ring 105 between fingers including the inserted finger. Since the microphone input connector 121 is provided on the right side surface of the handle front leg part 1041, the microphone input connector 121 protrudes neither forward nor rearward from the handle front leg part 1041. This makes it possible to widely secure the gripping space 142 and the ring operation space 143, and hence the operability is very excellent.

Further, as shown in FIG. 16, the microphone input connector 121 is disposed at a location lower than the display unit 110. The surface of the front cover 120 to which the microphone input connector 121 is fixed is formed as an inclined surface 1201 which is inclined such that it is positioned inward as it extends toward the lower side, and hence the microphone input connector 121 is fixed to the front cover 120 in a state inclined downward by a predetermined angle α.

For this reason, a cable of an external microphone-side connector 144 engaged with the microphone input connector 121 is naturally directed obliquely downward. Further, since the microphone input connector 121 is disposed at the location lower than the display unit 110, even when the display unit 110 is rotated about the first rotational axis 131, and opened to the right side, the display unit 110 is prevented from being hooked on the cable of the external microphone-side connector 144.

Further, as shown in FIG. 17, the microphone input connector 121 is provided at a location away from a rotation range 145 of the display unit 110 which is rotated about the second rotational axis 132, by a predetermined distance in a rear direction. Therefore, even when the display unit 110 is rotated about the second rotational axis 132, the display unit 110 is also prevented from being hooked on the cable of the external microphone-side connector 144.

From the above, the display unit 110 and the cable of the external microphone-side connector 144 are in a positional relation that even when the display unit 110 is rotated about any of the first rotational axis 131 and the second rotational axis 132, the display unit 110 and the cable of the external microphone-side connector 144 are prevented from interfering with each other. This enables the photographer to smoothly rotate the display unit 110 without feeling stress. Further, since the cable of the external microphone-side connector 144 extends obliquely downward, even when the display unit 110 is opened to the right side, and then the display surface 126 is turned to face the rear side, the photographer can have a wide and excellent view of the display surface 126.

Figure 18:
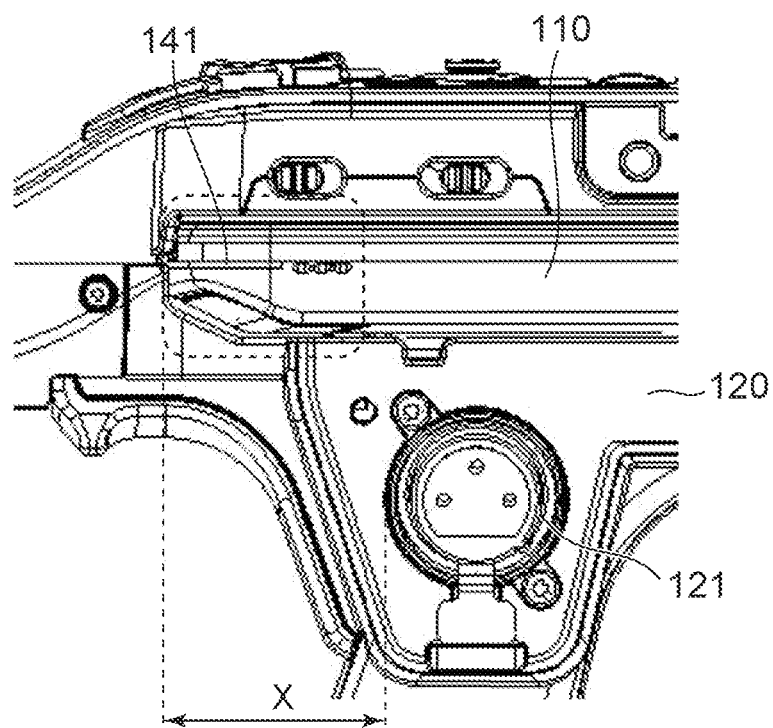
FIG. 18 is a view showing a positional relationship between an opening operation section at a front end of the display unit and the microphone input connector.

Here, FIG. 18 is a view showing a positional relationship between one of the opening operation sections 141 at the front end of the display unit 110 and the microphone input connector 121. As shown in FIG. 18, the components of the camera 100 are arranged such that the front end of the display unit 110 in the accommodated state is rearward of the microphone input connector 121 by a distance indicated by X and at least part of the one opening operation section 141 is largely exposed. This makes it possible to easily operate the opening operation section 141 when opening the display unit 110 to the left side.

Figure 19:
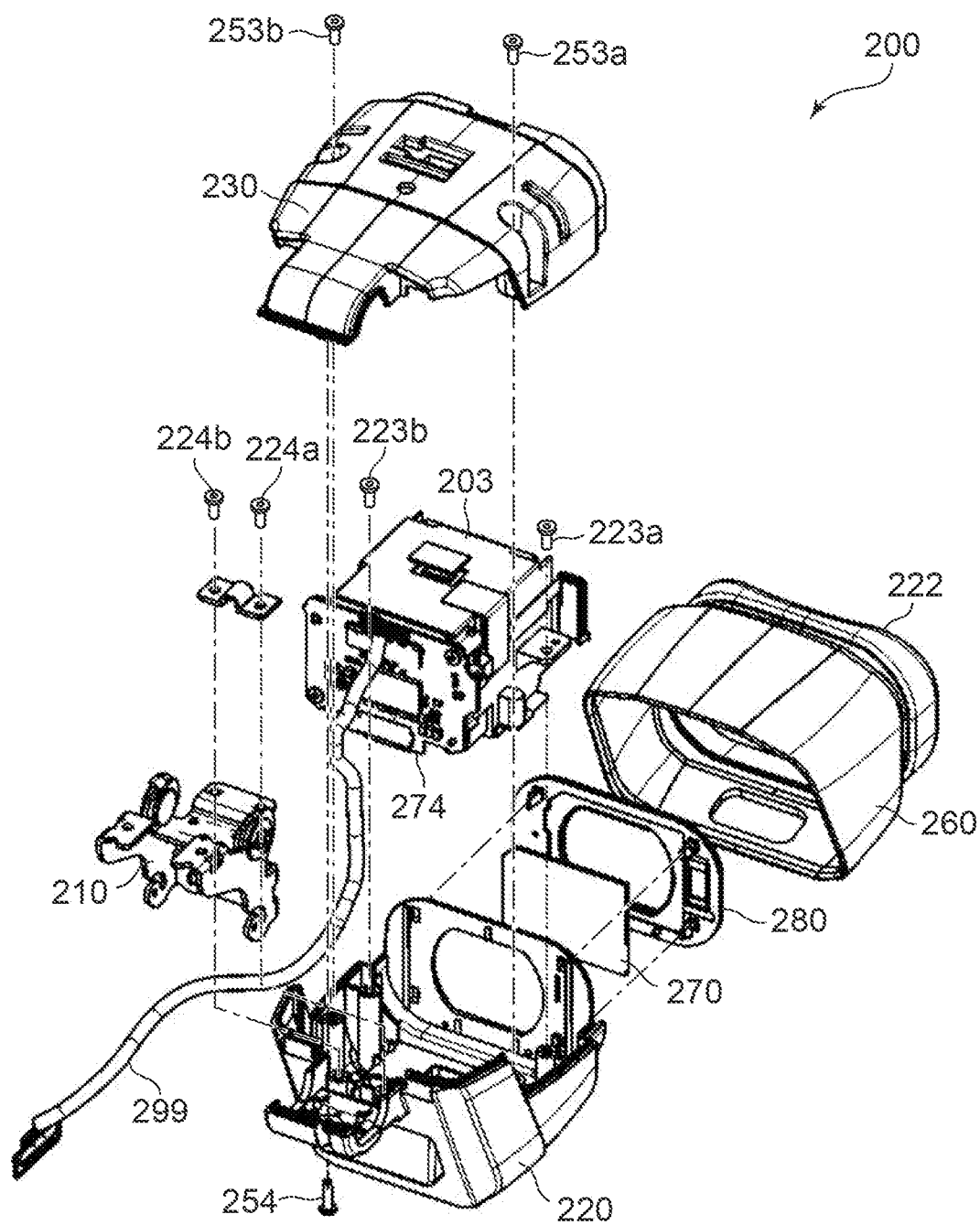
FIG. 19 is an exploded perspective view of an electronic viewfinder.
Figure 20A:
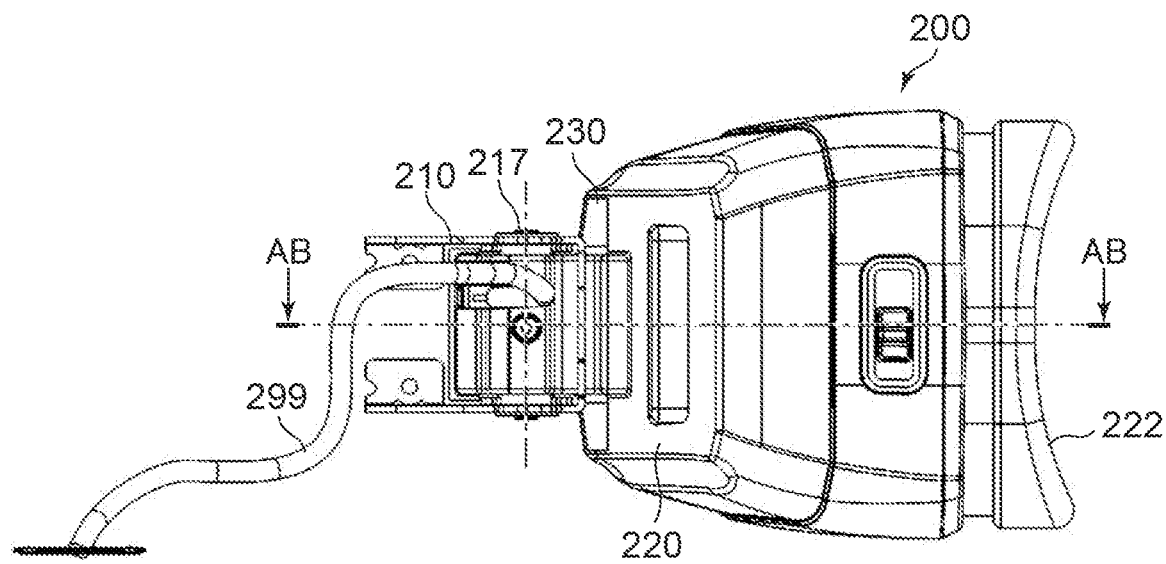
FIG. 20A is a view of the electronic viewfinder, as viewed from the bottom.

Next, a structure of the EVF 200 will be described with reference to FIGS. 19 and 20. FIG. 19 is an exploded perspective view of the EVF 200. FIG. 20A is a view of the EVF 200, as viewed from the bottom, and FIG. 20B is a cross-sectional view taken along AB-AB in FIG. 20A.

As shown in FIG. 19, an EVF inner case 203 which holds an EVF circuit board 274 is fixed to an EVF lower cover 220 with fixing screws 223a and 223b. An EVF hinge 210 for rotating the EVF 200 is fixed to the EVF lower cover 220 with hinge fixing screws 224a and 224b.

Further, an EVF upper cover 230 and the EVF lower cover 220 are fixed to each other with EVF screws 253a and 253b, and a screw 254, and then an eye cup 260 is fitted such that the eye cup 260 covers the EVF upper cover 230 and the EVF lower cover 220. Further, a lens cover 270 is fitted to the EVF lower cover 220 by a lens cover-holding member 280 from an eyepiece surface 222 which is located on the rear side of the camera 100. EVF wires 299 electrically connect between the EVF circuit board 274 and the main circuit board of the camera body 101.

Figure 20B:
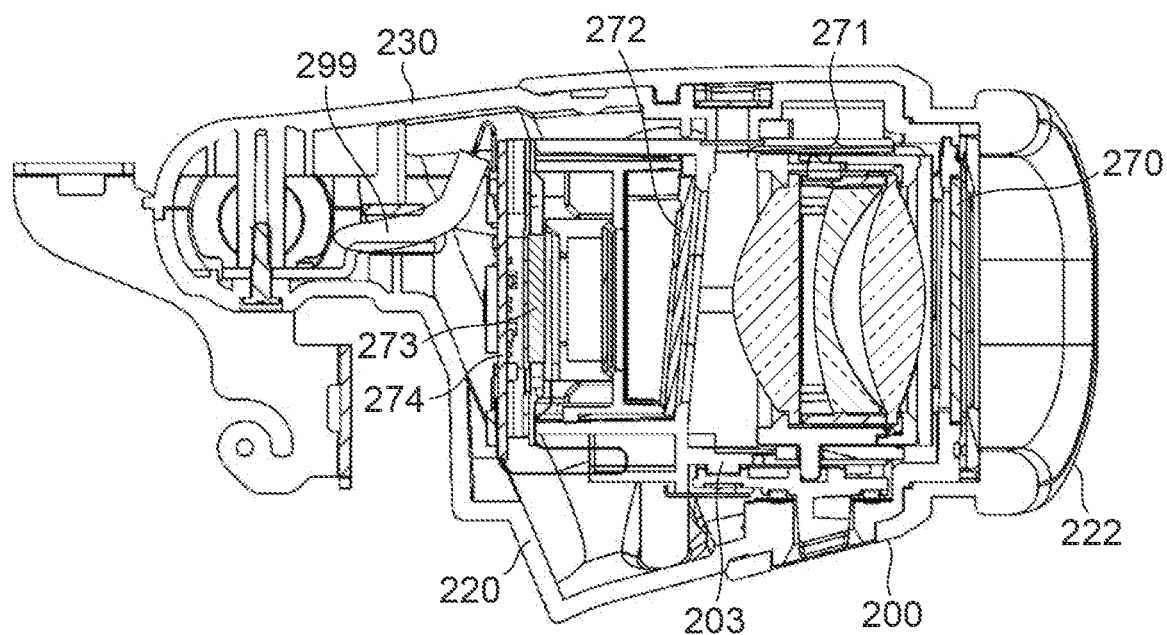
FIG. 20B is a cross-sectional view taken along AB-AB in FIG. 20A.

Inside the EVF inner case 203, as shown in FIG. 20B, there are arranged the lens cover 270, a lens section 271, a reflection preventing component 272, and an image display element 273, from the side of the eyepiece 222 in the mentioned order. The image display element 273 is electrically connected to the EVF circuit board 274 that controls power supply and an image.

Image signals sent from the main circuit board of the camera body 101 are sent to the EVF circuit board 274 through the EVF wires 299 electrically connected to the main circuit board, and are further sent from the EVF circuit board 274 to the image display element 273, thereby being displayed as an optical image. The optical image displayed by the image display element 273 is condensed by the lens section 271, and is transmitted through the lens cover 270, whereby the optical image can be visually recognized by the naked eye.

Figure 21:
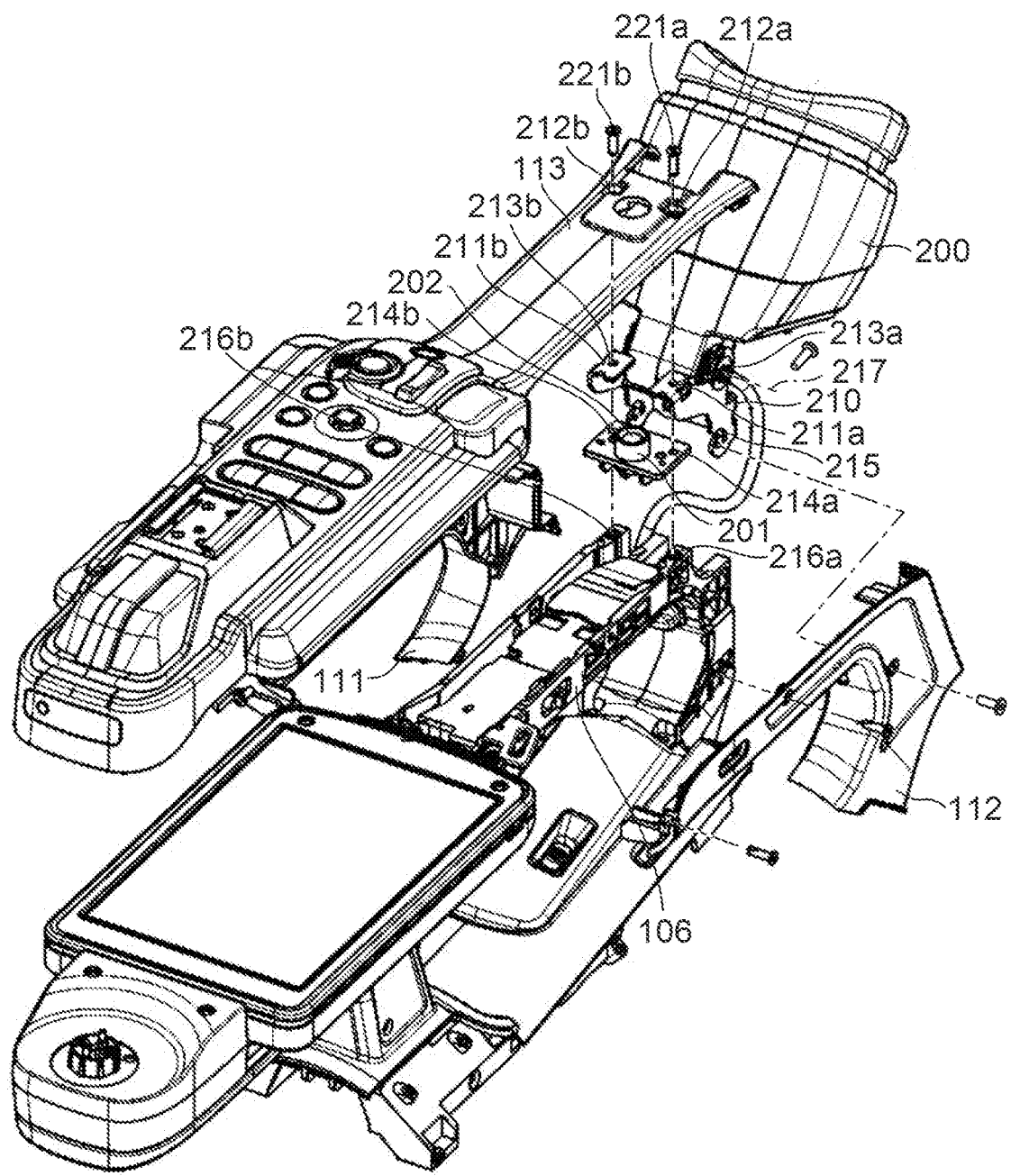
FIG. 21 is an exploded perspective view of a part of the handle, to which the electronic viewfinder is attached.
Figure 22:
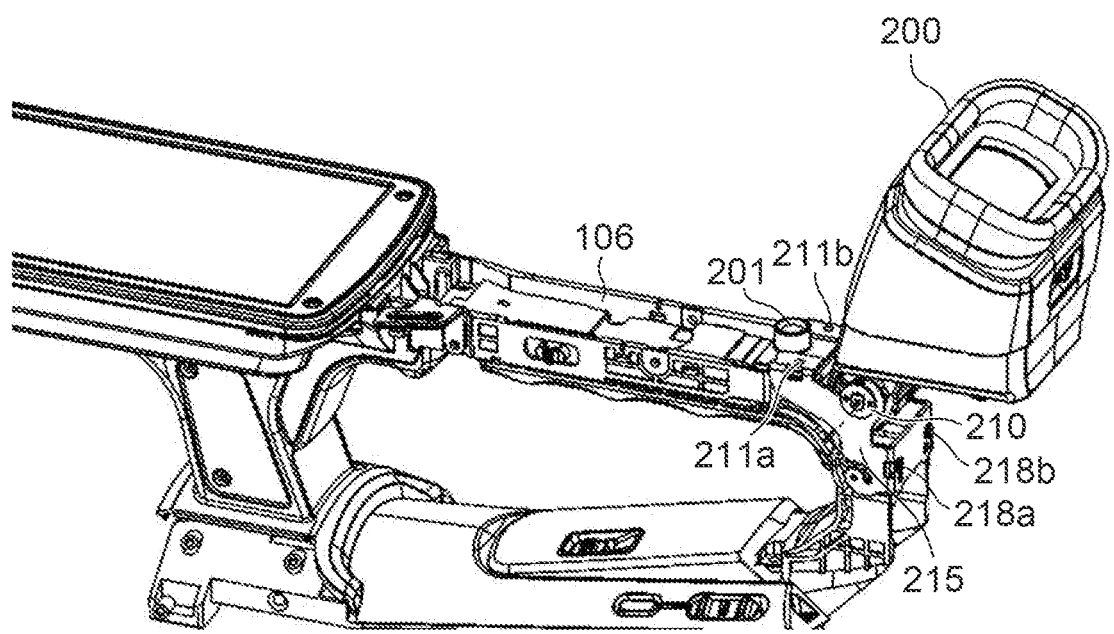
FIG. 22 is a perspective view of the part to which the electronic viewfinder is attached.

FIG. 21 is an exploded perspective view of a part of the handle 104, to which the EVF 200 is attached. FIG. 22 is a perspective view of the part to which the EVF 200 is attached. Note that in FIG. 22, the upper cover 113, the right side exterior part 111, and the left side exterior part 112, which are fixed after attaching the EVF 200, are omitted from illustration for convenience of explanation.

As shown in FIG. 21, the EVF 200 is rotatably connected to the handle 104 by the EVF hinge 210 formed of a metallic material having high strength, such as stainless steel. Further, the EVF 200 is screwed to the handle frame 106 with EVF hinge screws 221a and 221b, in a state in which the external device attachment portion 201 and the EVF hinge 210 are sequentially attached to the handle frame 106 and finally the upper cover 113 is fixed.

The EVF hinge screw 221a and 221b are inserted through hole 212a and 212b of the upper cover 113, hinge through holes 213a and 213b formed in fixing portion 211a and 211b of the EVF hinge 210, and tripod through holes 214a and 214b of the external device attachment portion 201, and then screwed in pilot holes 216a and 216b of the handle frame 106, respectively. At this time, the external device attachment portion 201 is fixed such that a tripod screw hole 202 for attaching an external accessory is exposed from an upper exterior.

Further, as shown in FIG. 22, the EVF hinge 210 is fixed by hinge screws 218a and 218b from the rear side. A hinge supporting member 215 forming the fixing portions 211a and 211b of the EVF hinge 210 is a member for holding a rotational shaft of the EVF hinge 210, and hence the hinge supporting member 215 requires high strength.

Further, by arranging the external device attachment portion 201 on the rear side (toward the EVF 200) of the handle 104, it is possible to press and fix the external device attachment portion 201 with the fixing portions 211a and 211b of the EVF hinge 210, and hence it is not required to increase the number of components.

Figure 23A:
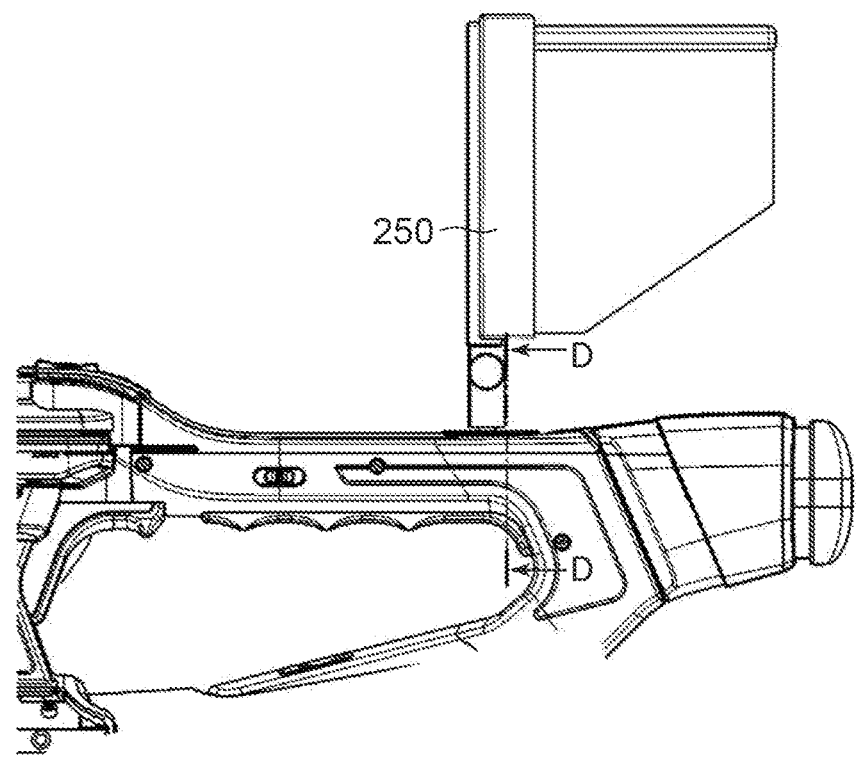
FIG. 23A is a side view of the handle in a state in which an image display device as an example of an external accessory has been attached to a tripod screw hole of an external device attachment portion.
Figure 23B:
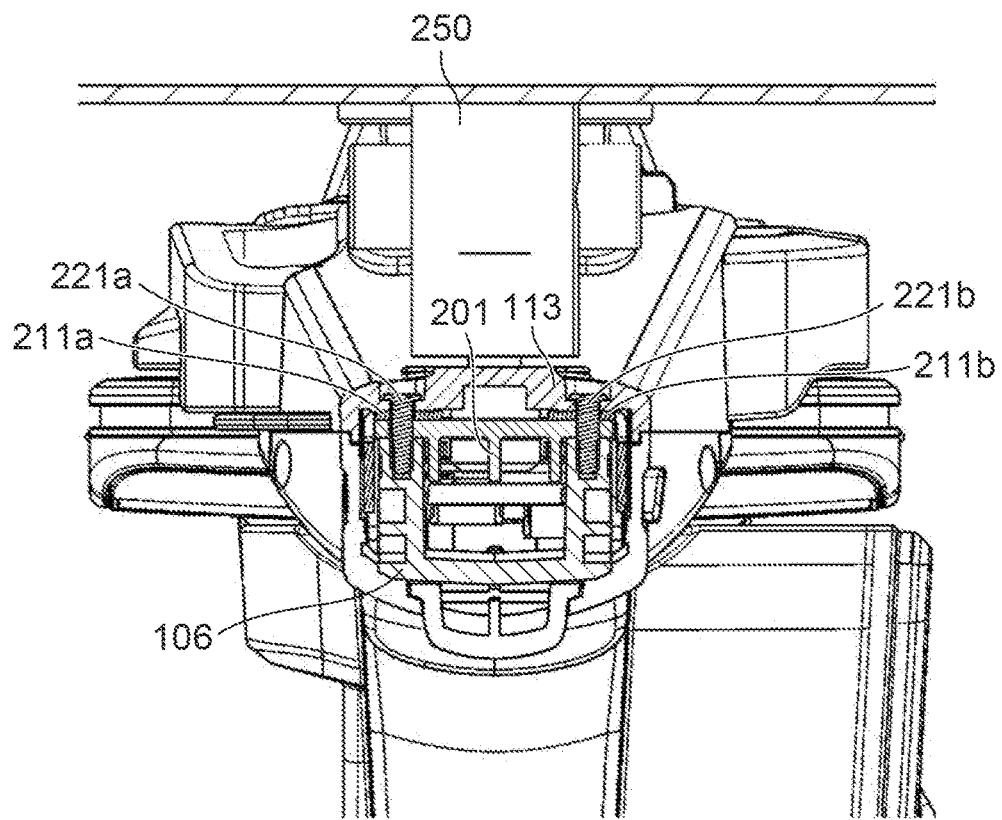
FIG. 23B is a cross-sectional view taken along D-D in FIG. 23A.

FIG. 23A is a side view of the handle 104 in a state in which an image display device 250 as an example of the external accessory has been attached to the tripod screw hole 202 of the external device attachment portion 201, and FIG. 23B is a cross-sectional view taken along D-D in FIG. 23A.

Referring to FIGS. 23A and 23B, the external device attachment portion 201 as a metallic molded component is sandwiched between the handle frame 106 as a resin molded component which is reinforced by glass fiber or carbon fiber, and the fixing portions 211a and 211b of the EVF hinge 210 as a metallic molded component, such as stainless steel. Further, the external device attachment portion 201 is covered by the upper cover 113, and is fixed by the EVF hinge screws 221a and 221b in this state.

This makes it possible to prevent the external device attachment portion 201 from floating or being displaced even when an impact or a load is applied to the image display device 250 attached to the external device attachment portion 201, and thereby ensure the strength for holding the image display device 250, without providing any additional components.

Figure 24A:
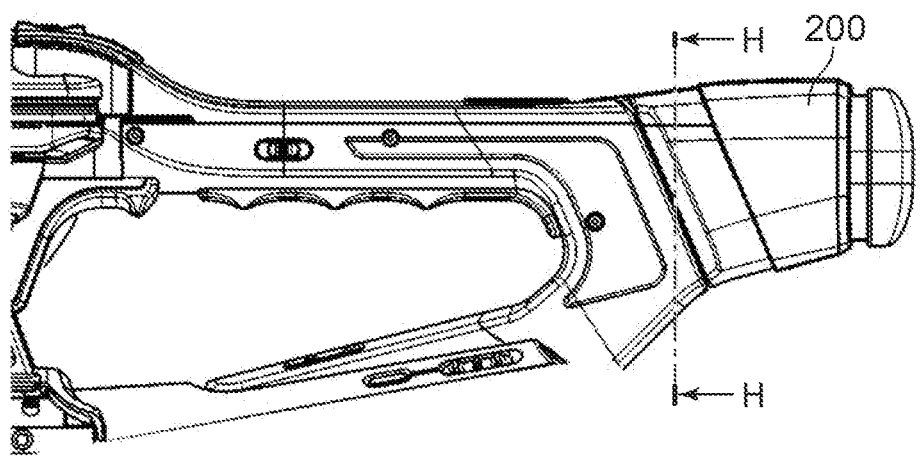
FIG. 24A is a view showing a fitted state of the electronic viewfinder.
Figure 24B:
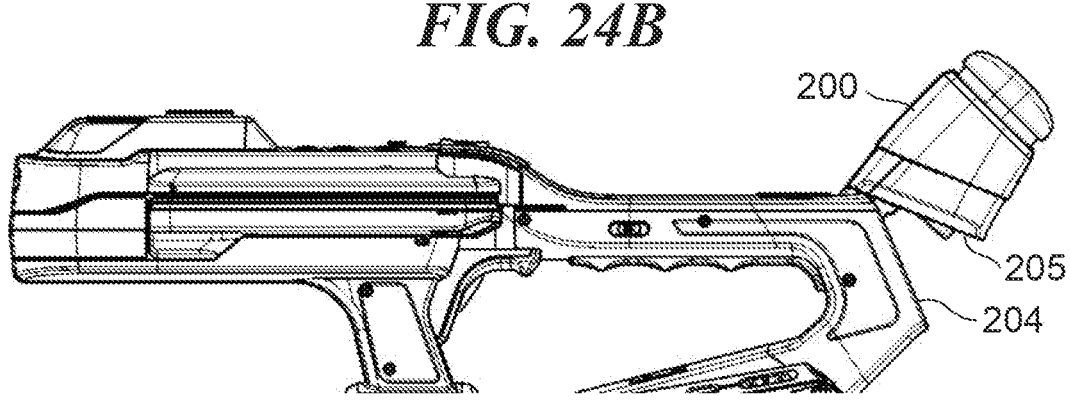
FIG. 24B is a view showing an operated state A of the electronic viewfinder.
Figure 24C:
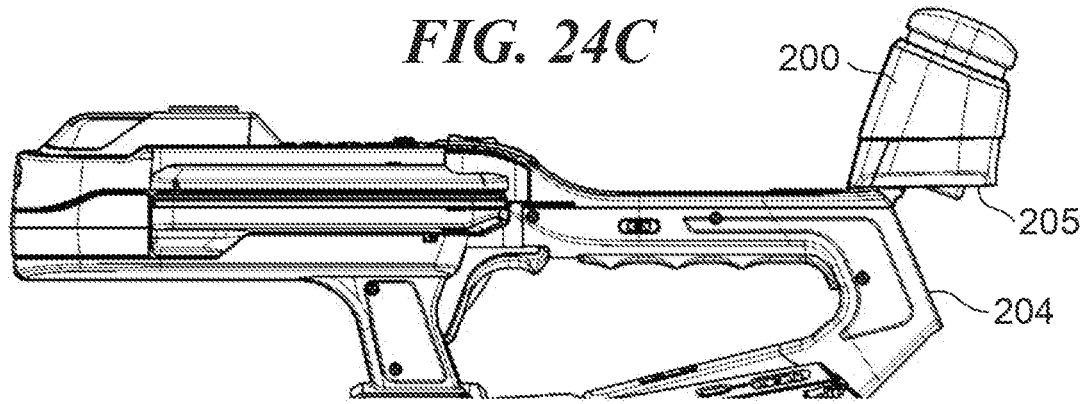
FIG. 24C is a view showing an operated state B of the electronic viewfinder.

Further, it is possible to position the EVF 200 in the three states of a fitted state shown in FIG. 24A, an operated state A shown in FIG. 24B, and further, an operated state B shown in FIG. 24C, by rotating the EVF hinge 210. In the fitted state shown in FIG. 24A, a rear surface portion 204 of the handle 104 and a front surface portion 205 of the EVF 200 are brought into contact with each other obliquely with respect to the vertical direction.

Figure 25A:
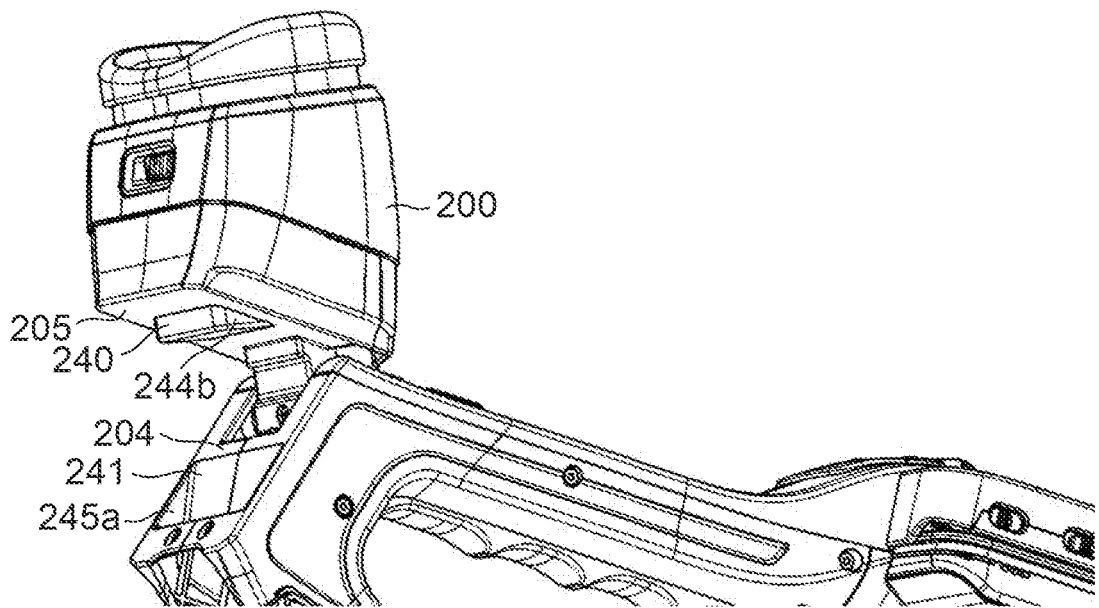
FIG. 25A is a perspective view showing the operated state B of the electronic viewfinder in which the electronic viewfinder is in a flipped-up position.
Figure 25B:
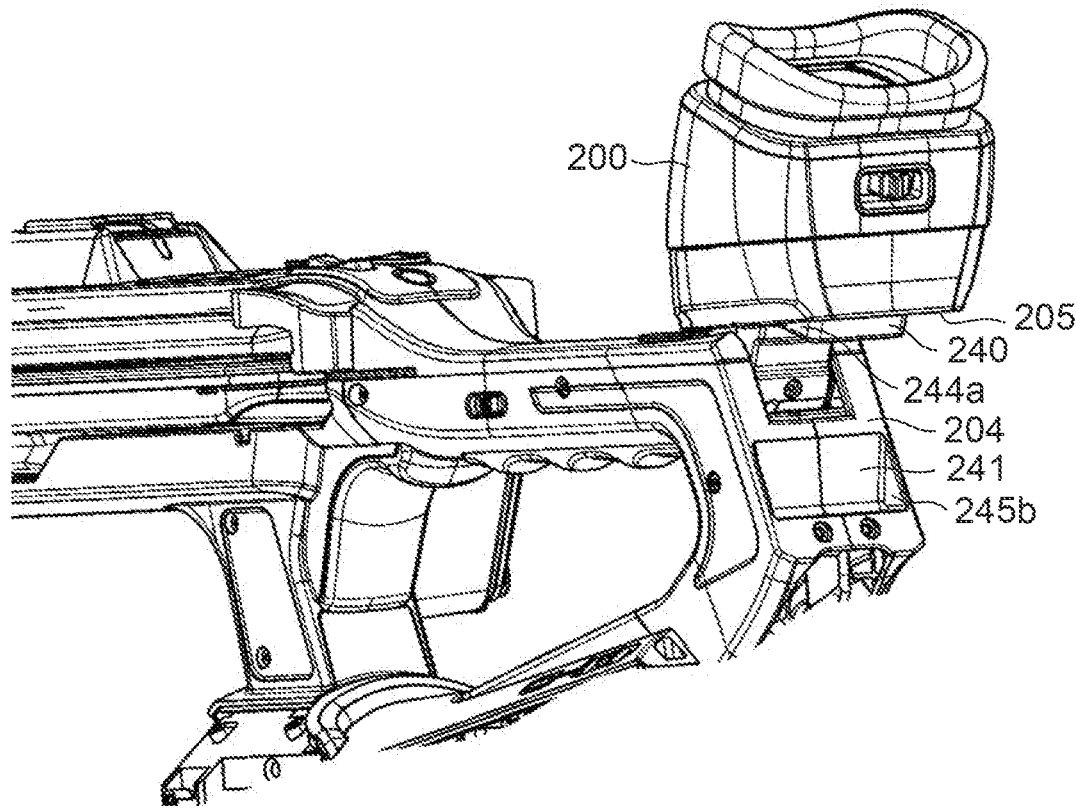
FIG. 25B is a perspective view of the electronic viewfinder, as viewed from an opposite side of FIG. 25A.

FIG. 25A is a perspective view showing the operated state B in which the EVF 200 is in a flipped-up position, and FIG. 25B is a perspective view of the EVF 200, as viewed from an opposite side of FIG. 25A. As shown in FIGS. 25A and 25B, the front surface portion 205 of the EVF 200 is formed with an EVF protruding portion 240, and the rear surface portion 204 of the handle 104 is formed with a handle recess portion 241 in which the EVF protruding portion 240 can be accommodated in a position opposed to the EVF protruding portion 240, when the EVF 200 is in the fitted state.

Figure 26:
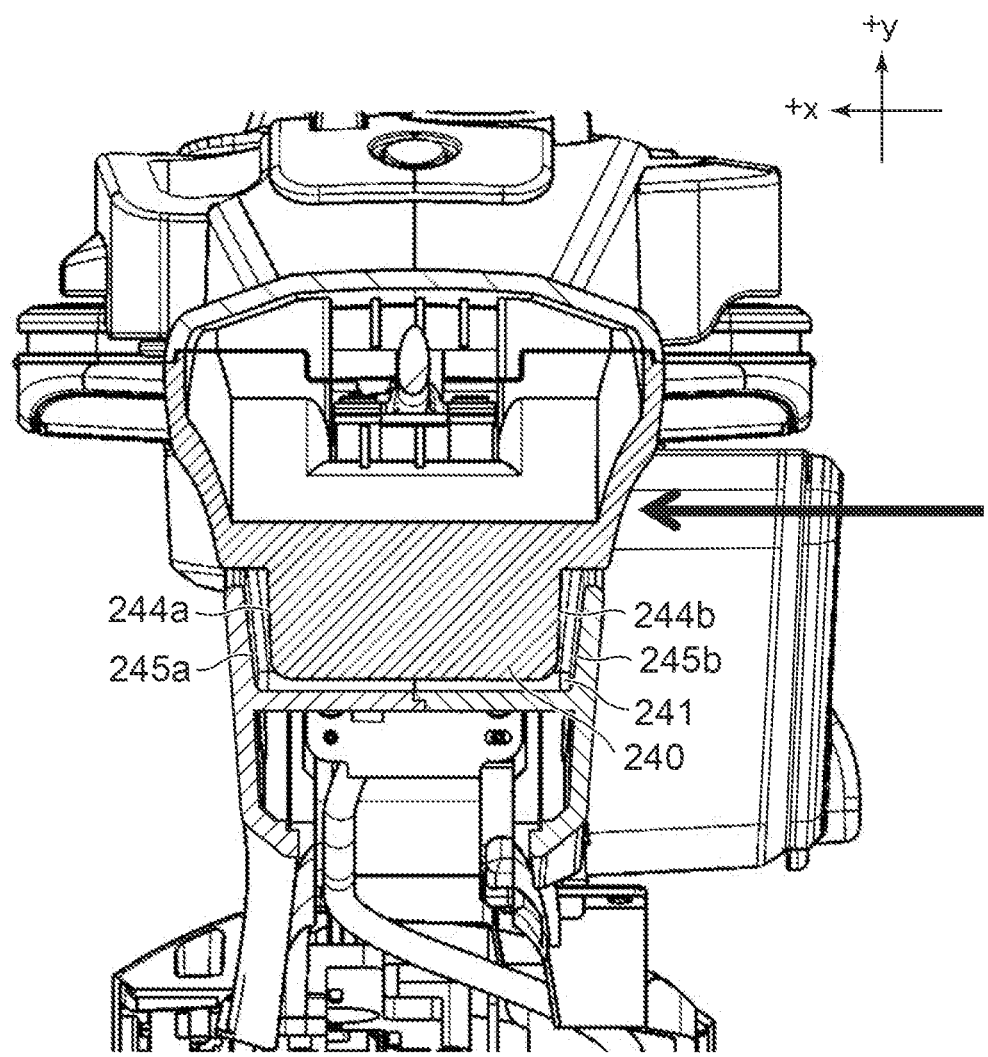
FIG. 26 is a cross-sectional view taken along H-H in FIG. 24A.

FIG. 26 is a cross-sectional view taken along H-H in FIG. 24A. As shown in FIG. 26, an inner wall 245a and an inner wall 245b of the handle recess portion 241 are formed at respective locations opposed to side surfaces 244a and 244b of the EVF protruding portion 240, respectively. With this arrangement, when a load is applied to the EVF 200 along a direction (direction indicated by +x in FIG. 26) of an EVF rotational axis 217 of the EVF hinge 210, the side surface 244a is brought into abutment with the inner wall 245a, and can receive the load, whereby it is possible to prevent the EVF hinge 210 from being broken due to the applied load.

Figure 27A:
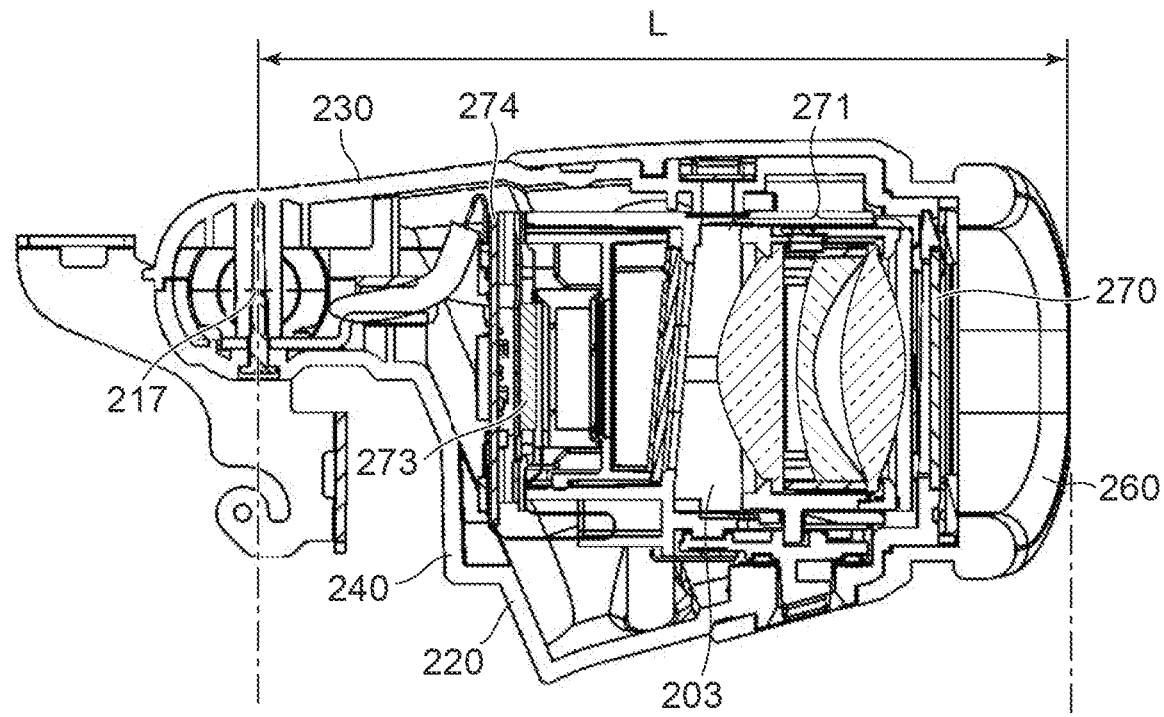
FIG. 27A is a cross-sectional view of the electronic viewfinder.
Figure 27B:
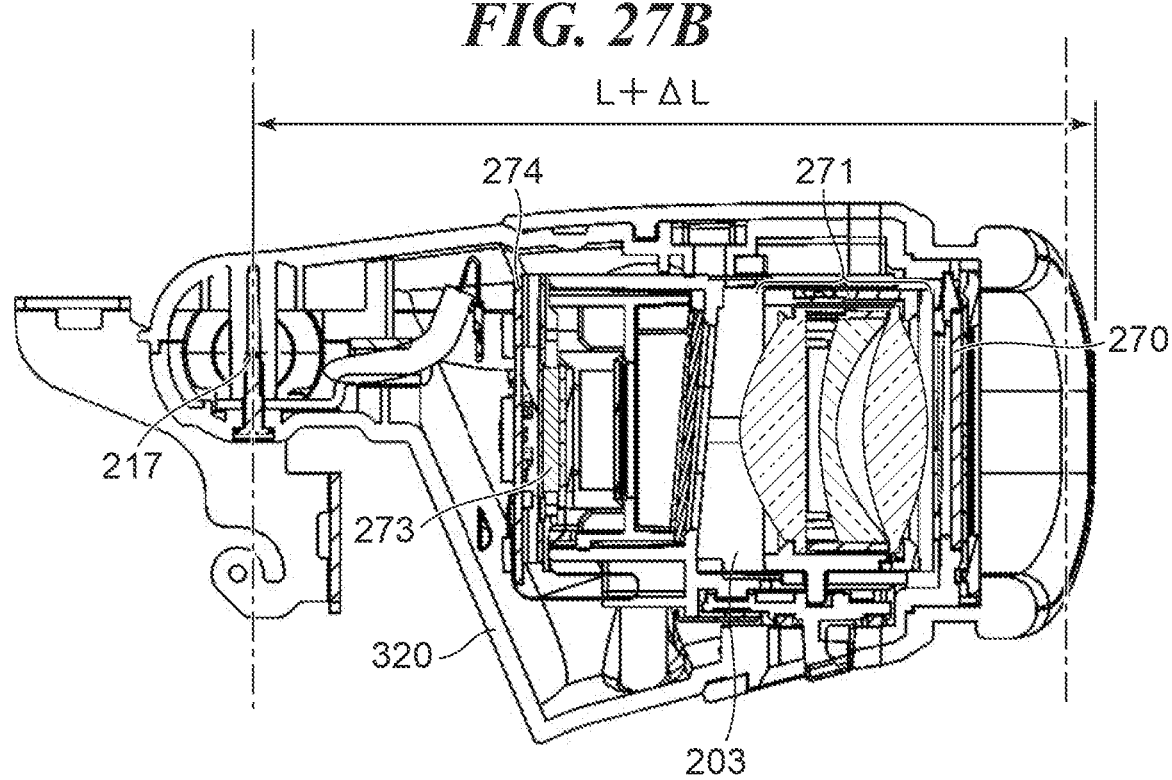
FIG. 27B is a cross-sectional view of an electronic viewfinder including a lower cover which is not provided with a protruding portion.

FIG. 27A is a cross-sectional view of the EVF 200, and FIG. 27B is a cross-sectional view of an EVF formed by replacing the EVF lower cover 220 by an EVF lower cover 320 without provision of the protruding portion 240.

Referring to FIG. 27A, part of the EVF circuit board 274 is accommodated inside the EVF protruding portion 240 provided on the EVF lower cover 220, and a length from the EVF rotational axis 217 of the EVF hinge 210 to the end of the EVF 200 is represented by L. On the other hand, referring to FIG. 27B, the EVF circuit board 274 cannot be accommodated inside the EVF protruding portion 240. That is, it is necessary to shift the EVF inner case 203 holding the EVF circuit board 274 etc., toward the eyepiece surface 222 to accommodate the EVF circuit board 274, and hence the total length of the EVF is increased.

Therefore, as shown in FIG. 27A, by providing the EVF protruding portion 240 on the front surface portion 205 of the EVF 200, it is possible to accommodate part of the EVF circuit board 274, and thereby reduce the length from the EVF rotational axis 217 of the EVF hinge 210 to the end of the EVF 200 by ΔL.

Further, as shown in FIGS. 24A to 24C, in the present embodiment, the front surface portion 205 of the EVF 200 is formed obliquely with respect to the vertical direction, and hence it is possible to reduce the protruding shape of the EVF protruding portion 240 from the front surface portion 205.

Further, as shown in FIG. 27A, the EVF protruding portion 240 can be arranged at a location away from the EVF rotational axis 217, and hence when an impact is applied to the EVF 200, a position where the load is received is away from the EVF rotational axis 217, and it is possible to receive and withstand a larger moment. This makes it possible to ensure the strength against an impact without increasing the size of the EVF 200.

As described above, in the present embodiment, in the camera 100 including the display unit 110 on the front end of the handle 104, which can be opened to both of the right and left sides in the horizontal direction, it is possible to dispose the external microphone connector 121 at the optimum location without increasing the size of the camera 100.

Note that the present invention is not limited to the above-described embodiment by way of example, but the material, the shape, the size, the form, the number, and the arrangement position of each member and so forth can be changed without departing from the spirit and scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-051132 filed Mar. 19, 2018, which is hereby incorporated by reference herein in its entirety.

What is claimed is:

1. An image pickup apparatus comprising:
   an apparatus body;
   a handle that includes a front leg part and a rear leg part, which extend upward from the apparatus body, and a gripping part which connects between the front leg part and the rear leg part substantially in parallel with an optical axis of an image pickup optical system;
   a front part that is integrally formed with the handle on a front side of the handle in a direction of the optical axis of the image pickup optical system; and
   a display unit that is supported in a manner rotatable with respect to the front part in a substantially horizontal direction via a first rotational shaft portion,
   wherein a connector to which a first external device is connected is provided on a side surface of the front leg part.

2. The image pickup apparatus according to claim 1, wherein the connector is disposed at a location lower than the display unit, on the side surface which is inclined inward by a predetermined angle as the side surface extends toward the lower side.

3. The image pickup apparatus according to claim 1, wherein the first external device is an external microphone.

4. The image pickup apparatus according to claim 1, wherein the display unit is supported in a manner rotatable about the first rotational shaft portion between an accommodated state in which the display unit is substantially in parallel with the optical axis and at least two in-use states in which a display surface can be visually recognized, and when the display unit is each in-use state, the display unit is supported in a manner rotatable about a second rotational shaft portion which is substantially orthogonal to the first rotational shaft portion.

5. The image pickup apparatus according to claim 1, wherein a front end portion of the display unit is positioned rearward of the connector when the display unit is in the accommodated state.

6. The image pickup apparatus according to claim 4, wherein a hinge having the first rotational shaft portion and the second rotational shaft portion is fixed to the front part, the image pickup apparatus further comprising an upper unit that covers upper parts of the hinge and the display unit.

7. The image pickup apparatus according to claim 5, wherein the upper unit has an opening substantially coaxial with the first rotational shaft portion,
   wherein the hinge has a protruding portion provided thereon which is engaged with the opening, such that the protruding portion is substantially coaxial with the first rotational shaft portion, and
   wherein the protruding portion has a flange member connected thereto which is larger in outer shape than the opening.

8. The image pickup apparatus according to claim 7, wherein the upper unit includes a frame sheet metal provided on the protruding portion.

9. The image pickup apparatus according to claim 6, wherein a predetermined clearance is formed between the display unit and the upper unit.

10. The image pickup apparatus according to claim 6, wherein a member which is lower in sliding resistance than other members is provided between the hinge and the upper unit at a location where the hinge and the upper unit are closest to each other.

11. The image pickup apparatus according to claim 1, further comprising an electronic viewfinder attached to a rear side of the gripping part in a rotatable manner, and an attachment portion provided on the gripping part for attaching a second external device thereto, and
   wherein the attachment portion, which is formed of a metallic material, is fixed to the gripping part, which is formed of a resin material, together with a member for holding a rotational shaft of the electronic viewfinder.

12. The image pickup apparatus according to claim 10, wherein the second external device is an image display device.

13. The image pickup apparatus according to claim 10, wherein the attachment portion is arranged at a location where the second external device does not interfere with gripping of the gripping part.

14. The image pickup apparatus according to claim 10, wherein the attachment portion is fixed together with a member forming an exterior surface of the gripping part.

15. The image pickup apparatus according to claim 10, wherein the gripping part has a recess formed therein for accommodating the protruding portion of the electronic viewfinder in a fitted state of the electronic viewfinder.

16. The image pickup apparatus according to claim 14, wherein at least a circuit board for controlling the electronic viewfinder is arranged inside the protruding portion of the electronic viewfinder.

17. The image pickup apparatus according to claim 14, wherein in a case where a load is applied in an axial direction of the rotational shaft of the electronic viewfinder, the protruding portion of the electronic viewfinder and the recess of the gripping part are brought into abutment with each other.

* * * * *